(12) United States Patent
Imamura

(10) Patent No.: US 11,107,132 B2
(45) Date of Patent: Aug. 31, 2021

(54) SYSTEM FOR GENERATING ADVERTISEMENT AND METHOD FOR GENERATING ADVERTISEMENT

(71) Applicant: FUJITSU LIMITED, Kawasaki (JP)

(72) Inventor: Takeshi Imamura, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/799,080

(22) Filed: Feb. 24, 2020

(65) Prior Publication Data

US 2020/0302487 A1 Sep. 24, 2020

(30) Foreign Application Priority Data

Mar. 20, 2019 (JP) .............................. JP2019-052163

(51) Int. Cl.
*G06Q 30/02* (2012.01)
(52) U.S. Cl.
CPC ..... *G06Q 30/0276* (2013.01); *G06Q 30/0255* (2013.01); *G06Q 30/0261* (2013.01); *G06Q 30/0266* (2013.01)
(58) Field of Classification Search
CPC .................. G06Q 30/0272; G06Q 30/0643
USPC ......................................................... 725/93
See application file for complete search history.

(56) References Cited

U.S. PATENT DOCUMENTS

| | | | | |
|---|---|---|---|---|
| 8,150,743 | B2* | 4/2012 | Brown | G06Q 30/0643 705/27.2 |
| 2002/0107737 | A1* | 8/2002 | Kaneko | G06Q 30/0272 705/14.68 |
| 2008/0270228 | A1* | 10/2008 | Dasdan | G06Q 30/0256 705/14.54 |
| 2013/0111531 | A1* | 5/2013 | Kawai | H04N 21/8106 725/93 |
| 2013/0301934 | A1* | 11/2013 | Cok | H04N 1/0019 382/218 |
| 2017/0301001 | A1* | 10/2017 | Wilkinson | G06Q 30/0269 |
| 2018/0124438 | A1* | 5/2018 | Barnett | H04N 21/4826 |

FOREIGN PATENT DOCUMENTS

WO 2001/067319 A1 9/2001

\* cited by examiner

*Primary Examiner* — Saba Dagnew
(74) *Attorney, Agent, or Firm* — Fujitsu Patent Center

(57) ABSTRACT

A system for generating an advertisement includes: a memory; and a processor coupled to the memory, the processor configured to execute a process including: obtaining an address of a content related to a product to be advertised, the product being determined by referring to at least one of an operation history of a user terminal operated by a user, an attribute of the user, and activity information of the user; obtaining a still image or a moving image related to the product; generating advertisement data by associating the address with the still image or the moving image; and displaying the advertisement data on the user terminal.

10 Claims, 23 Drawing Sheets

EXAMPLE OF URL LIST

| ID | URL | categories |
|---|---|---|
| aaa1 | https://ad1.aaa.co.jp/AA1.html | VEHICLE,AA1,aaa |
| aaa2 | https://ad1.aaa.co.jp/AA2.html | VEHICLE,AA2,aaa |
| aaa3 | https://ad1.aaa.co.jp/AA3.html | VEHICLE,AA3,aaa |
| ⋮ | ⋮ | ⋮ |
| aaaN | https://ad2.aaa.co.jp/AB1.html | VEHICLE,AB1,aaa |
| ⋮ | ⋮ | ⋮ |
| bbb1 | https://bbb.com/BBB.html | BEVERAGE,BBB,bbb |
| ⋮ | ⋮ | ⋮ |

FIG.13

EXAMPLE OF IMAGE LIST ~51b

| ID | URL | URLID | tags |
|---|---|---|---|
| xxx1 | https://ad1.aaa.co.jp/movie/AA1_1.mp4 | aaa1 | IN-TOWN, STYLISH |
| xxx2 | https://ad1.aaa.co.jp/movie/AA1_2.mp4 | aaa1 | SEASIDE, SUMMER, DRIVE |
| xxx3 | https://ad1.aaa.co.jp/movie/AA1_3.mp4 | aaa1 | FAMILY, PARENT-CHILDREN, FOOTBALL |
| ... | ... | ... | ... |
| xxy1 | https://ad1.aaa.co.jp/img/AA2_A.jpg | aaa2 | IN-TOWN, STYLISH |
| xxy2 | https://ad1.aaa.co.jp/img/AA2_B.jpg | aaa2 | MOUNTAIN, OFF-ROAD, WILD |
| xxy3 | https://ad1.aaa.co.jp/img/AA2_C.jpg | aaa2 | FAMILY, PARENT-CHILDREN, MT. FUJI |
| ... | ... | ... | ... |
| xxz1 | https://ad1.aaa.co.jp/img/AA3_A.jpg | aaa3 | CAMP, FAMILY, PARENT-CHILDREN |
| ... | ... | ... | ... |
| xyy1 | https://ad2.aaa.co.jp/img/AB1_1.jpg | aaaN | FAST, COOL |
| ... | ... | ... | ... |
| yyy1 | https://bbb.com/mov/BBB.mov | bbb1 | BRACING, REFRESHING, SPORTS |
| ... | ... | ... | ... |

EXAMPLE OF RELATIONSHIP INFORMATION

| items1 | items2 |
|---|---|
| MUSICIAN A | BEVERAGE, BBB |
| PET | ROUTE W, TRAVEL, FERRY |
| ⋮ | ⋮ |

SYSTEM FOR GENERATING ADVERTISEMENT AND METHOD FOR GENERATING ADVERTISEMENT

CROSS-REFERENCE TO RELATED APPLICATION

This application is based upon and claims the benefit of priority of the prior Japanese Patent application No. 2019-052163, filed on Mar. 20, 2019, the entire contents of which are incorporated herein by reference.

FIELD

The embodiment discussed herein relates to a system for generating an advertisement and a method for generating an advertisement.

BACKGROUND

A conventional technique of displaying a Web advertisement on a terminal such as a smartphone statically stores a combination of an image to be displayed on a screen and a Uniform Resource Locator (URL) to be linked to the image in a server for distributing the advertisement.

When a Web advertisement is to be displayed on the terminal, the image statically stored in association with the URL is transmitted from the server and displayed on the terminal.

[Patent Document 1] Pamphlet of International Publication No. WO 01/067319

SUMMARY

According to an aspect of the embodiment, a system for generating an advertisement includes: a memory; and a processor coupled to the memory, the processor configured to execute a process including: obtaining an address of a content related to a product to be advertised, the product being determined by referring to at least one of an operation history of a user terminal operated by a user, an attribute of the user, and activity information of the user; obtaining a still image or a moving image related to the product; generating advertisement data by associating the address with the still image or the moving image; and displaying the advertisement data on the user terminal.

The object and advantages of the invention will be realized and attained by means of the elements and combinations particularly pointed out in the claims.

It is to be understood that both the foregoing general description and the following detailed description are exemplary and explanatory and are not restictive of the invention.

BRIEF DESCRIPTION OF DRAWINGS

FIG. 13 is a diagram illustrating an example of an image list;

DESCRIPTION OP EMBODIMENTS

Figure 1:
FIG. 1 is a diagram illustrating an example of a manner of presenting ads.

However, the conventional technique for displaying a Web advertisement admits of improvement.

Hereinafter an embodiment of the present invention will be described below with reference to the accompanying drawings. However, the embodiment described below is a merely example, and there is no intention to exclude various modifications and application of techniques not explicitly described below. For example, the present embodiment can be variously modified and implemented without departing from the scope thereof. In the drawings used in the following embodiment, the same reference numbers denote the same or similar parts or elements unless otherwise specified. Throughout the specification and the drawings, the words "advertisement" and "advertisements" are sometimes abbreviated to "ad" and "ads", respectively.

[1] One Embodiment

[1-1] Technique of Displaying Web Advertisement:

FIG. 1 is a diagram illustrating an example of a manner of presenting an advertisement. As illustrated in FIG. 1, a terminal 101 such as a smartphone used by a consumer (hereinafter, sometimes referred to as a "user" using an advertisement) receives an advertisement (ad) 103a from an advertiser 103 via a network 102 or the like, and presents the advertisement 103a to the user. The advertisement 103a distributed to a terminal 101 via a networks 102 may be referred to as a "Web advertisement" or a "digital advertisement".

Figure 2:
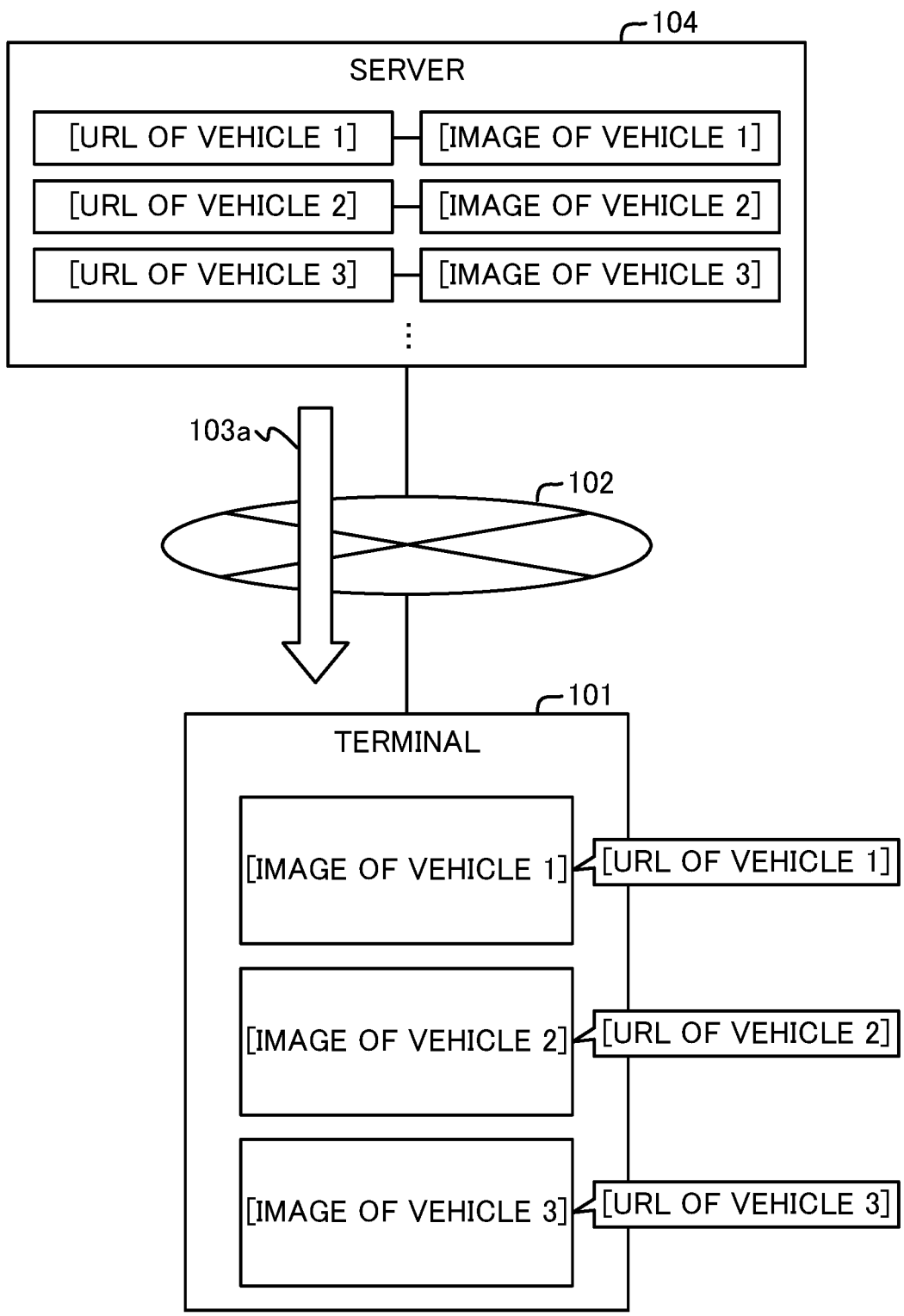
FIG. 2 is a diagram illustrating an example of displaying advertisements of FIG. 1.

FIG. 2 is a diagram illustrating an example of displaying an advertisement 103*a* illustrated in FIG. 1. As illustrated in FIG. 2, the server 104 that distributes the advertisement 103*a* statically stores a combination of an image to be displayed on the screen of the terminal 101 and a URL linked to the image.

In the example of FIG. 2, the server 104 statically stores combinations of [images of the vehicle 1] and [URLs of the vehicle 1] indicating the URL of the advertisement page of the vehicle 1 for the product [vehicle 1] to be subject of the ad 103*a*. The same applies to the products [vehicle 2] and [vehicle 3].

Then, the server 104 transmits, as the ad 103*a*, [image of vehicle 1] which is linked to [URL of vehicle 1], [image of vehicle 2], and [image of vehicle 3], which are linked to [URL of vehicle 2], and [URL of vehicle 3], respectively, to the terminal 101. The terminal 101 displays the received [image of the vehicle 1] to [image of the vehicle 3].

Here, in the manner of presenting an advertisement illustrated in FIG. 1, the following premise may be provided.

For example, the content of the advertisement 103*a* is determined by the sender exemplified by the advertiser 103 or an advertising company contracted with the advertiser 103 on the basis of, for example, the browsing history of the web pages of the user, and the user does not have a selection right. In the digital advertisement, the advertisement company selects the advertisement 103*a* to be presented to the terminal 101 in units of particular group (cluster) not in units of individual person. In addition, the conversion rate satisfactorily reaches 1%, and most digital advertisements are only displayed without being clicked (selected) on the terminal 101.

The user is provided with various kinds of information by a variety of advertisements, including the Web advertisements described above. However, it may be difficult for modern people who have many roles in work, housework, child-raising, and community activities (which are "multiple roles") and who have increased operating time per day of smartphones to select appropriate information on a product from the viewpoint of information volume and time. In one embodiment, the term "product" includes various items that may be the target or objects of a commercial transaction, such as articles, securities, rights, information, and services.

As the above, the user may be stressed in collecting information about the product and is ignoring most of these advertisements 103*a*, even if they have received many advertisements 103*a* that contain some useful information (which is a cobblestone mix). Accordingly, the conventional technique for displaying Web advertisement can be improved from the standpoint of presenting appropriate advertisements to users or from the standpoint of cost-effectiveness of advertisements.

In addition, ignoring most of the advertisement 103*a* means that unnecessary resources are consumed in at least one of the terminal 101, the network 102, and the server 104. Examples of unnecessary resources include a communication band of the network 102, for example, the Internet or the LAN (Local Area Network), a performance by the terminal 101 and the processor of the server 104 and a storage area of a memory. Consequently, a conventional technique for displaying Web advertisements can be improved from a viewpoint of resource-consuming.

As a solution to the above, one embodiment describes a technique for generating more personalized Web advertisement in one aspect. In another aspect, a method for generating resource-efficient Web advertisements is described.

[1-2] Control of Displaying Advertisement According to One Embodiment:

Recent years, information-analyzing capabilities have been enhanced in line with advances in the technology of Artificial Intelligence (AI), and for example, the AI makes it possible to generate advertisements that are optimal for individual users.

Figure 3:
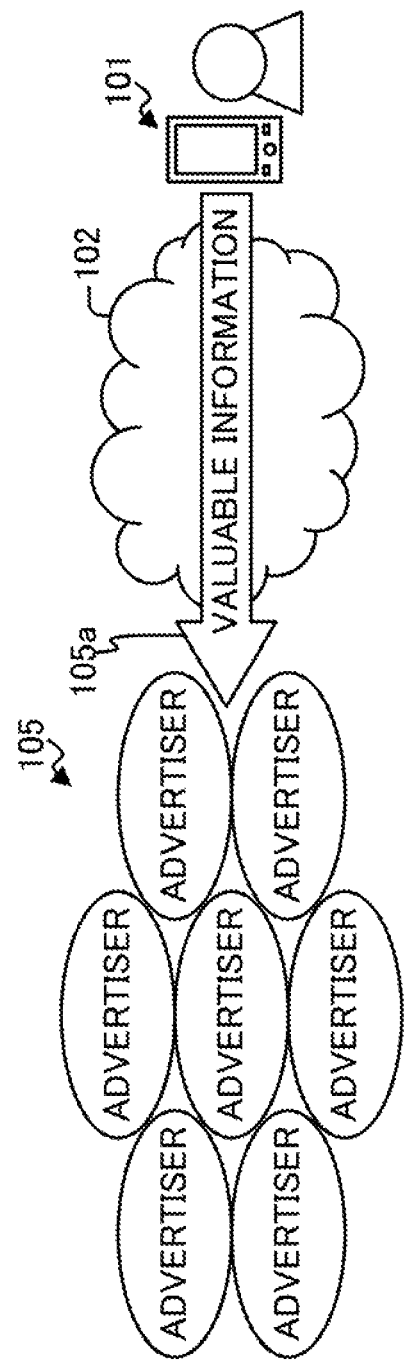
FIG. 3 is a diagram illustrating an example of a manner of presenting ads.

FIG. 3 is a diagram illustrating an example of a manner of presenting an advertisement. In one embodiment, as illustrated in FIG. 3, the AI can select, and obtain an advertisement suited to the user from advertisements that multiple advertisers 105 wish to advertise, and suggest the obtained advertisement to the user.

The AI may be performed, for example, in a server connected to the network 102, e.g., a server storing advertisement information of the advertisers 105, and presents valuable information to the user of the terminal 101 on the basis of various information about the user. In other words, in one embodiment, as illustrated in FIG. 3, the terminal 101 selectively acquires (receives) valuable information 105*a* from multiple advertisers 105.

Accordingly, in the example described with reference to FIG. 1, the AI can select a product having a high "ball" ratio from among multiple advertises 103*a* which are in a cobblestone mix.

For example, a user who feels vaguely "wanting to go to a travel" can collect "travel" information by searching the Internet or the like, but it is difficult to obtain information based on personal preferences such as where he/she wants to go and what he/she wants to go to.

On the other hand, according to one embodiment, it is possible to make a suggestion (recommendation) such as "whether to go to yyy or zzz" based on various information about the user of the terminal 101, for example, information that the user went to "xxx" in the past, information that has made "aaa" in the past.

In this manner, like a butler on the side of the user, the AI can suggest, to the user, for example, information necessary for the user, information desired by the user, or information given "notice" to the user in the form of multiple advertisements (options). Such a proposal makes it possible to change the way of the business, and it is assumed that a large paradigm shift occurs in the manner of presenting the advertisements.

Hereinafter, description will now be made in relation to an advertisement distribution system as one example of one embodiment, which provides a function as a platform for performing analysis of information of a user, editing of an advertisement based on the analysis result, and proposal of an edited advertisement to a user by means of the AI.

Figure 4:
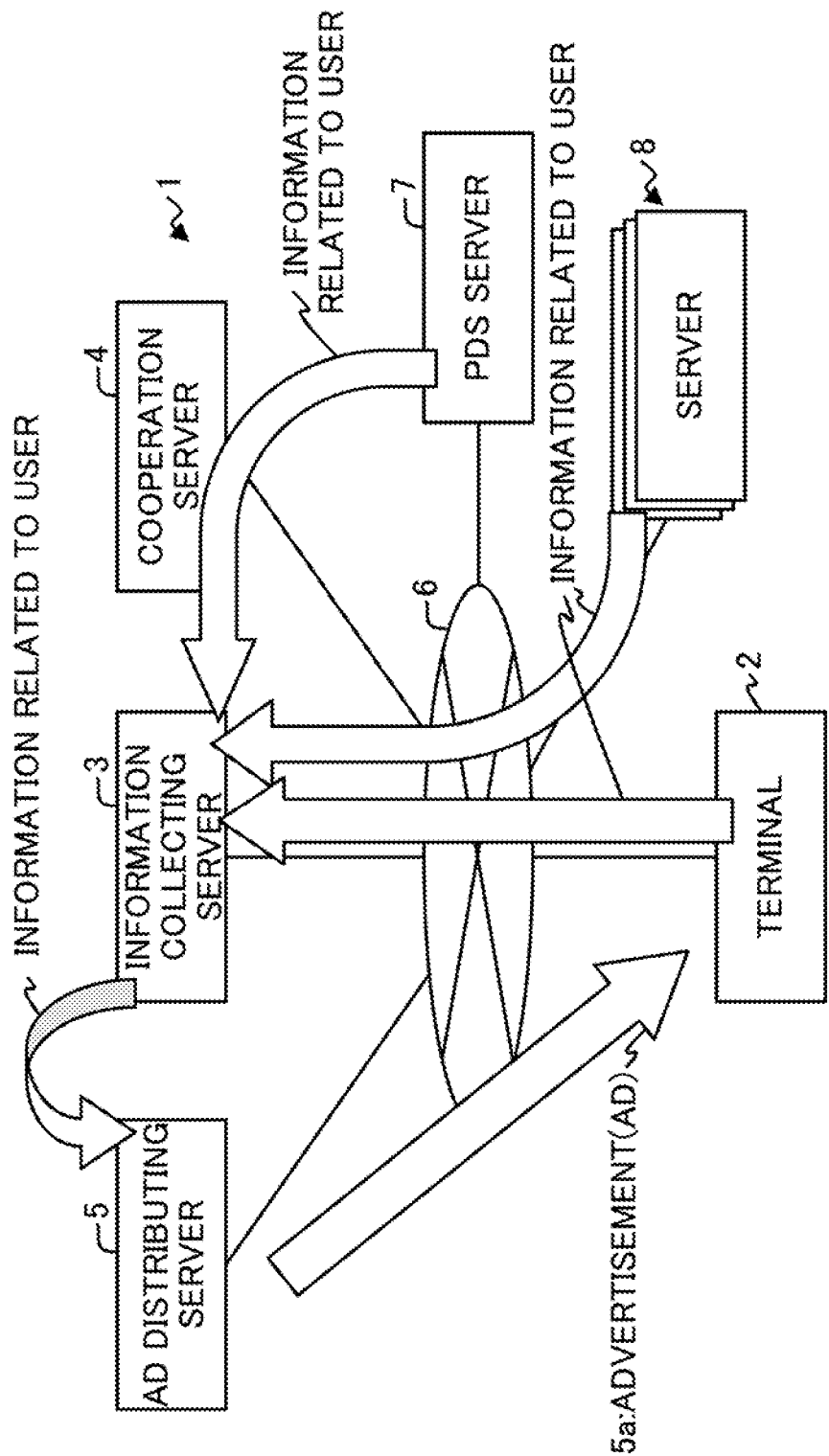
FIG. 4 is a diagram illustrating an example of the configuration of a system for distributing an advertisement according to one embodiment.

[1-3] System for Distributing Advertisement According to One Embodiment:

FIG. 4 is a diagram illustrating an example of the configuration of an ad distributing system 1 according to one embodiment. The ad distributing system 1 is an example of a system that generates advertisements, and may illustratively include a terminal 2, an information collecting server 3, a cooperation servers 4, and an advertisement (ad) distributing server 5, as illustrated in FIG. 4.

The terminal 2 is an example of the user terminal used by the user. Examples of the terminal 2 include various types of computer having a communication function and being exemplified by a Personal Computer (PC) such as a smart phone, a tablet, a laptop or a desktop, and a mobile phone. FIG. 4 illustrates one terminal 2 and alternatively the ad distributing system 1 may include multiple terminals 2 used by multiple users that uses the advertisements.

The ad distributing system 1 may include, for example, multiple terminals 2 owned by the same user. Such multiple terminals 2 owned by the same user may be used in different scenes such as, for example, purposes and times, may be of the same type as multiple smartphones, or may be of different types such as a smartphone and a tablet. Such multiple terminals 2 can be identified as terminal 2 owned by the same user by, for example, an account, Subscriber Identity Module (SIM), and a contract.

The information collecting server 3 is a server that collects and accumulates information related to users. The data accumulated by the information collecting server 3 is used for processing performed by the ad distributing server 5.

The cooperation server 4 performs cooperation between the information collecting server 3 and an external server in order to obtain at least part of information of the information related to the user accumulated in the information collecting server 3 from the external server.

Examples of the external server include a Personal Data Store (PDS) server 7 illustrated in FIG. 4, and servers 8 of various companies and the like that deal with information related to the user.

The PDS server 7 is a server for accumulating and managing at least a part of information related to the user, and the PDS server 7 is a server for providing data to a third party (i.e., the cooperation server 4 in one embodiment). When the information related to the user is accumulated and managed by the terminal 2 and the PDS server 7 is not used, the advertisement distribution system 1 is allowed to have a configuration in which the advertisement distribution system 1 does not have the cooperation server 4.

The multiple servers 8 are ones capable of providing information related to the user to the information collecting server 3, and ones owned by or used by various companies. Examples of the companies include, for example, telecommunications carriers, vendors of the terminal 2 or the Operating System (OS), banks, credit card companies, securities companies, electronic money or virtual money management companies, companies that sell or offer various types of product. Companies that sell or offer a variety of product may be, for example, various sales or offer forms such as online shops, department stores, specialty stores, etc., and may include industries such as travel agencies, real estate, and transportation.

The ad distributing server 5 is an example of an apparatus for generating an advertisement, and, by using the AI, analyzes information of the user, edits the advertisement based on the analysis result, and proposes the edited advertisement to the user on the basis of information related to the user accumulated by the information collecting server 3.

For this purpose, the ad distributing server 5 may store a storing destination address of the contents related to the product determined to be a subject of the ad 1a to be displayed on the terminal 2, such as a URL and an image related to the product, and the image itself or a storing destination address of the image related to the product, such as the URL. In other words, the "storing destination address" may indicate a storing destination of a content, and therefore may be one example of "address" of a content related to a product to be advertised.

The terminal 2, the information collecting server 3, the cooperation server 4, the ad distributing server 5, the PDS server 7, and the servers 8 are each example of an information processing apparatus or a computer, and may be communicably connected to each other via a network 6. The network 6 may include a Wide Area Network (WAN), a LAN, or a combination thereof. The WAN may include the Internet.

(Information Related to the User)

Here, description will now be made in relation to the information related to the user to be collected and accumulated by the information collecting server 3. The information related to user includes, for example, at least one (one type) of the following (1) to (3).

(1) Operation History of the Terminal 2 Operated by a User:

The operation history includes, for example, a history of an operation performed on an operating system (OS) or an application (APP) of a terminal 2.

An example of the "operation" includes a "searching process" performed using an APP such as a web browser of the terminal 2, but is not limited thereto. An example of the "Operation" includes various operations on the OS or APP, for example, operations such as settings on the OS, various operations on e-mail, Social Networking Service (SNS), web browsers, shopping or other-purpose APPs.

The type of "operation" includes, for example, letter input, voice input, data input, and selection. The operation of "selection" may include, for example, a process for selecting one or more pieces of information from among pieces of information presented on the terminal 2. An example of the operation of the search process Includes text search, voice search, image search, and map search, selection, and the operation "selection" in the searching process includes selection (tap) of a destination point or area with respect to an APP that displays a map.

The operation history may include, for example, an input letter string, a letter string of an analysis result of an input voice, input data, and selected information.

The operation history may be transmitted from the terminal 2 to the information collecting server 3, for example. The operation history may be sequentially transmitted each time the operation history is obtained, or may be transmitted at regular intervals or at timings when a certain amount of the operation history is accumulated in the terminal 2.

(2) Attributes of Users

The attributes include information belonging to the user exemplified by information relating to gender, age, body type, place of residence, family composition, hobby, and preference of the user.

The information of attributes may be stored in the terminal 2, the PDS server 7, and/or a server 8 of, for example, a communication carrier. The information collecting server 3 may collect information on user attributes from the PDS server 7 via the collaboration servers 4 or from the terminal 2 or the server 8. The information of the attributes stored in the terminal 2 may be information set in the terminal 2, such as personal information set in the OS or the APPs.

(3) Activity Information of Users:

The activity information is information other than the attributes of the user, and includes information related to the actual activity of the user. As non-limiting examples, the activity information may include position information and activity history of the user (terminal 2).

The "position information" is information indicating the position of the terminal 2, and is, for example, information on the present and the previous latitudes and longitudes (history information) of the terminal 2.

The position information may be stored in the terminal 2 and/or a server 8 of, for example, a communication carrier, and the information collecting server 3 may collect the position information from the terminal 2 or the server 8.

The "activity history" may include a history of information relating to, for example, actual behavior, actions, states of the user, such as exercise history, vital history, movement history, meal history, purchase history, coupon use history, ticket, purchase history, and speech content of the user. The "speech content" includes, for example, a history of content of speech such as voice, conversation, and utterance which are acquired and analyzed (e.g., continuously) by the terminal 2 for the operation of the voice recognition function of the terminal 2.

Among the activity histories, the exercise history, the vital history, the movement history, the meal history, the speech content, and the like may be stored in the terminal 2, or may be stored in a server 8 of, for example, a communication carrier, or a vendor of the terminal 2 or the OS. The information collecting server 3 may collect these pieces of data from the terminal 2 or the server 8.

Among the activity histories, the purchase history, the coupon use history, the ticket purchase history, and the like may be stored in the terminal 2, PDS server 7 and/or the server 8. Examples of the server 8 that stores these pieces of information include servers used by a communication carrier, a vendor of the terminal 2 or the OS, a bank, a credit card company, a security company, an electronic money or virtual currency management company, a company that sells or offers various products, and the like. The information collecting server 3 may collect these pieces of information from the terminal 2, the PDS server 7 or the server 8.

The information of (2) and (3) may be collected sequentially each time the information is generated or updated, or may be performed at predetermined time intervals or at timings when a predetermined amount of information is accumulated in a terminal 2, the PDS server 7 or the server 8, similarly to the above (1).

(Example of Displaying Advertisement According to One Embodiment)

Figure 5:
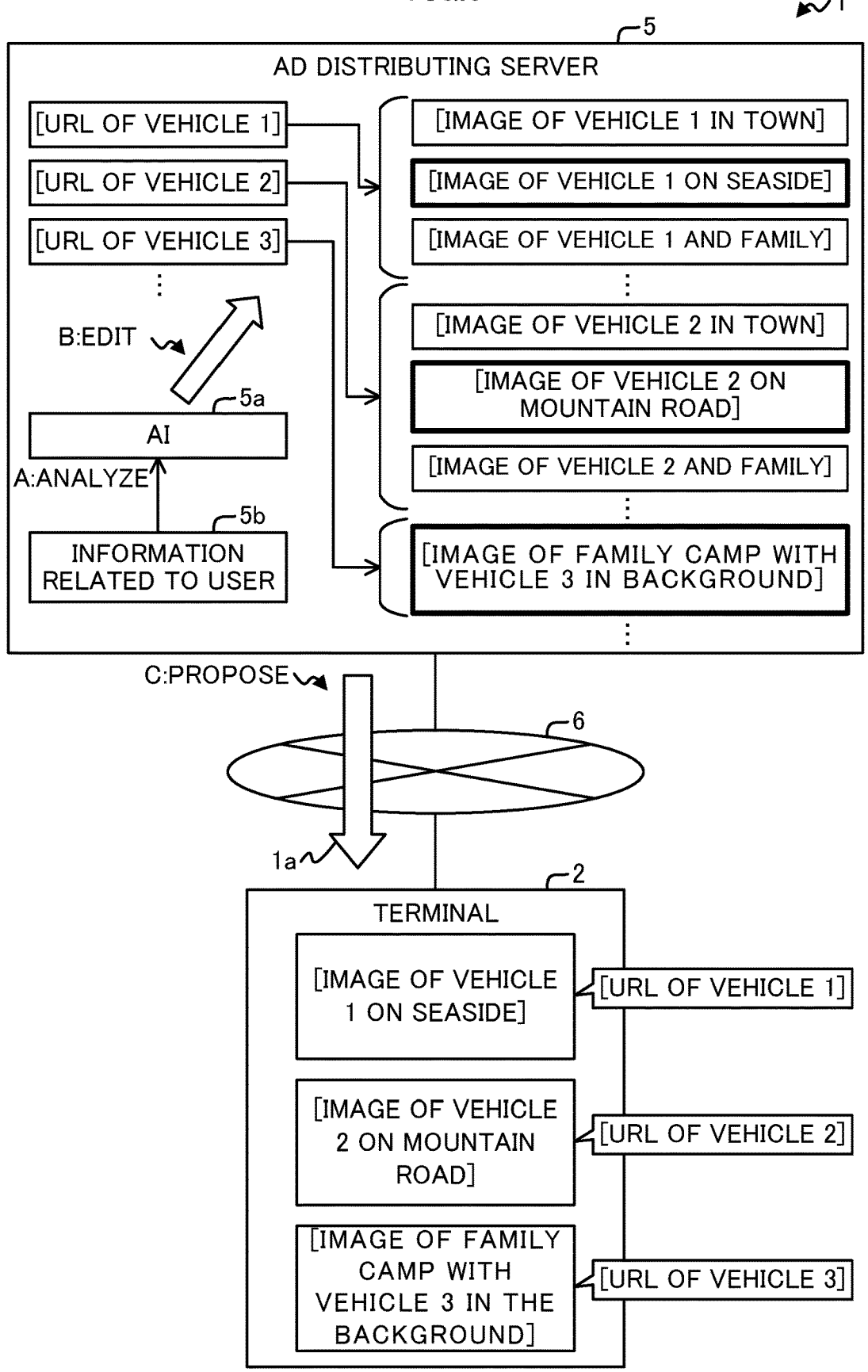
FIG. 5 is a diagram illustrating an example of displaying the advertisement of FIG. 4.

Next, description will now be made in relation to an example of displaying an advertisement according to one embodiment. FIG. 5 is a diagram illustrating an example of displaying the advertising 1*a* illustrated in FIG. 4. The ad distributing server 5 analyzes the information 5*b* related to the user of the ad distributing server 5 by means of the AI 5*a* (see the reference symbol A in FIG. 5).

For example, the ad distributing server 5 determines a product as a subject of ad 1*a* to be displayed on the terminal 2 on the basis of the information 5*b* related to the user by means of the AI 5*a*, and obtains the storing destination address of the contents related to the determined product. One embodiment assumes that an ad 1*a* is displayed on the web browser of the terminal 2.

Examples of the product to be a subject of the ad 1*a* include [vehicle 1], [vehicle 2], [vehicle 3], and the like in the example of FIG. 5. The contents related to the determined product include, for example, a web page displaying thereon the ad 1*a* of the determined product. The storing destination address of the content includes, for example, the URL of the web page, and in the example of FIG. 5, [URL of vehicle 1], [URL of vehicle 2], and [URL of vehicle 3], for example.

The web page displaying the ad 1*a* of the product may be provided by, for example, an advertiser of the ad 1*a*, an advertising company contracted with the advertiser, the ad distributing server 5, or the like. As will be described below, the web page displaying the ad 1*a* of the product may include a link to storing destination address of contents related to product related to the product to be a subject of ad 1*a* in the web page.

For example, the ad distributing server 5 may determine the product to be a subject of the ad 1*a* on the basis of any one of the operating history of the terminal 2, the attributes of the user, and the activity information of the user in the information 5*b* related to the user, or a combination of one or more of these. Then, the ad distributing server 5 may select the storing destination address of the contents related to the determined product.

In the example of FIG. 5, in cases where the keyword information included in the operation history of the terminal 2 includes "vehicle 1", the ad distributing server 5 determines "vehicle 1", "vehicle 2", and "vehicle 3" which are highly related to the keyword to be the products of the subjects of the ad 1*a*. Then, the ad distributing server 5 selects the URLs of the advertisement pages related to the determined products "vehicle 1", "vehicle 2", and "vehicle 3". The degree of relevance may be determined by the AI 5*a* on the basis of, for example, a matching rate of letter strings, a conversion rate, an analysis by the AI 5*a*, or definition information defining the degree of relevance.

In this manner, the ad distributing server 5 may determine the same or related products as the subjects of multiple ads 1*a* based on the information 5*b* related to the user.

Alternatively, the ad distributing server 5 may individually determine, for each advertisement 1*a*, a product to be a subject of the advertisement 1*a* on the basis of different pieces of information in the information 5*b* related to the user. For example, in cases where the keyword information included in the operation history includes "vehicle 1", "travel", "beverage", and the like, the ad distributing server 5 may make a determination on the information of each of these keywords and select [vehicle 1], [lodging], [beverage], and the like as products to be subjects of the ads 1*a*.

The ad distributing server 5 obtains images related to the product based on the information 5*b* related to the user by means of the AI 5*a*.

As illustrated in FIG. 5, the ad distributing server 5 may store two or more images related to the same single product. In other words, multiple images may be associated with each product.

The image related to a product includes, for example, a still image, a moving image, or a combination thereof. The still image or the moving image may include "sound" such as voice, music, electronic sound, and environmental sound. The example of FIG. 5 includes [image of vehicle 1 in town], [image of vehicle 1 on seaside], [image of vehicle 1 and family], . . . , [image of vehicle 2 in town], [image of vehicle 2 on mountain road], [image of vehicle 2 and family], . . . , [image of family camp with vehicle 3 in background].

In this manner, the image related to a product may be an image representing a usage scene, an impression of the world, an impression that an advertiser or an advertising agency wishes to give to users in relation to the product.

For example, the ad distributing server 5 may select one or more above images related to the product on the basis of at least one type of information among the operation history of the terminal 2, the attributes of the user, and the activity information of the user in the information 5*b* related to the user.

In the example illustrated in FIG. 5, in cases where the position information in the activity information of the user indicates "seaside", the ad distributing server 5 selects "the image of the vehicle 1 on the seaside" highly related to the position information from among the determined images relating to the product "vehicle 1". In another example of illustrated in FIG. 5, when the movement history in the activity information of the user indicates "movement of a mountainous area", the ad distributing server 5 selects the [image of the vehicle 2 on mountain road] highly related to the movement history from among the determined images related to the determined product "vehicle 2". Further, in another embodiment illustrated in FIG. 5, when the family composition among the attributes of the user indicates "Spouse" and "Child (Elementary School Student)", the ad distributing server 5 selects, from among the determined images related to the determined product "vehicle 3", an [image of family camp with vehicle 3 in background], which is highly relevant to the family composition.

In this manner, the ad distributing server 5 may individually select images associated with the product for each ad 1a based on the different information in the information 5b related to the user.

Alternatively, the ad distributing server 5 may select images of multiple products on the basis of the same or mutually related pieces of information in the information 5b related to the user for multiple advertisements 1a (advertisement frames). For example, the ad distributing server 5 may select "image of the vehicle 1 on the seaside", "image of the vehicle 2 on the seaside", and "image of the vehicle 3 on the seaside" for each of the "vehicle 1", "vehicle 2", and "vehicle 3" when the position information of the user indicates "seaside".

Upon obtaining of the storing destination address and the image of the content, the ad distributing server 5 generates advertisement data by associating the obtained storing destination address of the content and the image with each other by means of the AI 5a, i.e., edits the ad 1a (see reference symbol B in FIG. 5). The advertisement data may be, for example, display data in which an image and a storing destination address serving as a transition destination when the image is selected (clicked or tapped) are associated with each other.

Then, the ad distributing server 5 performs control for displaying of the advertisement data in the form of an ad 1a on the terminal 2. For example, the ad distributing server 5 proposes the ad 1a to the terminal 2 by transmitting the generated advertisement data to the terminal 2 (see reference symbol C in FIG. 5).

The terminal 2 presents the ad 1a to the user by displaying the received advertisement data on, for example, a monitor. For example, the terminal 2 may display the received advertisement data per se or the data processed on the received advertisement data in areas where the ad 1a is displayed by the OS or the APP.

In the example of FIG. 5, the terminal 2 displays the following three images as the ads 1a.
  "Image of Vehicle 1 on seaside" linked to the advertisement page of [Vehicle 1].
  "Image of Vehicle 2 on mountain road" linked to the advertisement page of [Vehicle 2].
  "Image of family camp with vehicle 3 in background" linked to the advertisement page of [vehicle 3].

As described above, according to one embodiment, the ad distributing server 5 generates advertisement data by dynamically associating the storing destination address of the content of the product that is the subject of the ad 1a with the image related to the product based on the information 5b related to the user, and displays the advertisement data on the terminal 2.

This can generate more personalized Web advertisements, e.g., ads 1a attractive to the user. In addition, since the conversion rate of the ad 1a can be increased, the resource efficiency in at least one of the terminal 2, network 6, and the ad distributing server 5 can be enhanced in the generation and distribution of the Web advertisements.

In the embodiment illustrated in FIG. 5, the ad distributing server 5 generates advertisement data based on information 5b related to the user, in other words, information for understanding an individual user, but the present invention is not limited to this.

As will be described later, the ad distributing server 5 may alternatively generate advertisement data based on information for understanding the world, for example, information related to groups to which the user belongs.

Figure 6:
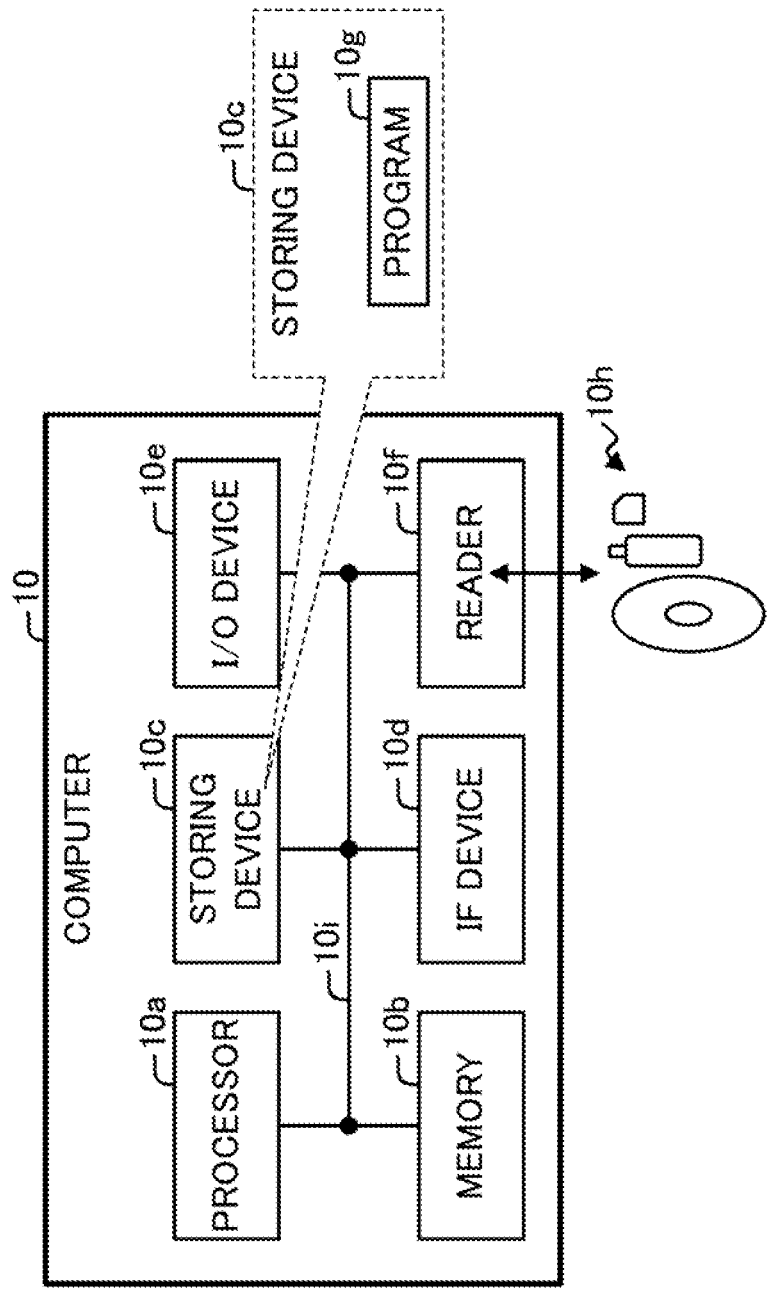
FIG. 6 is a block diagram illustrating an example of the hardware configuration of a computer.
Figure 7:
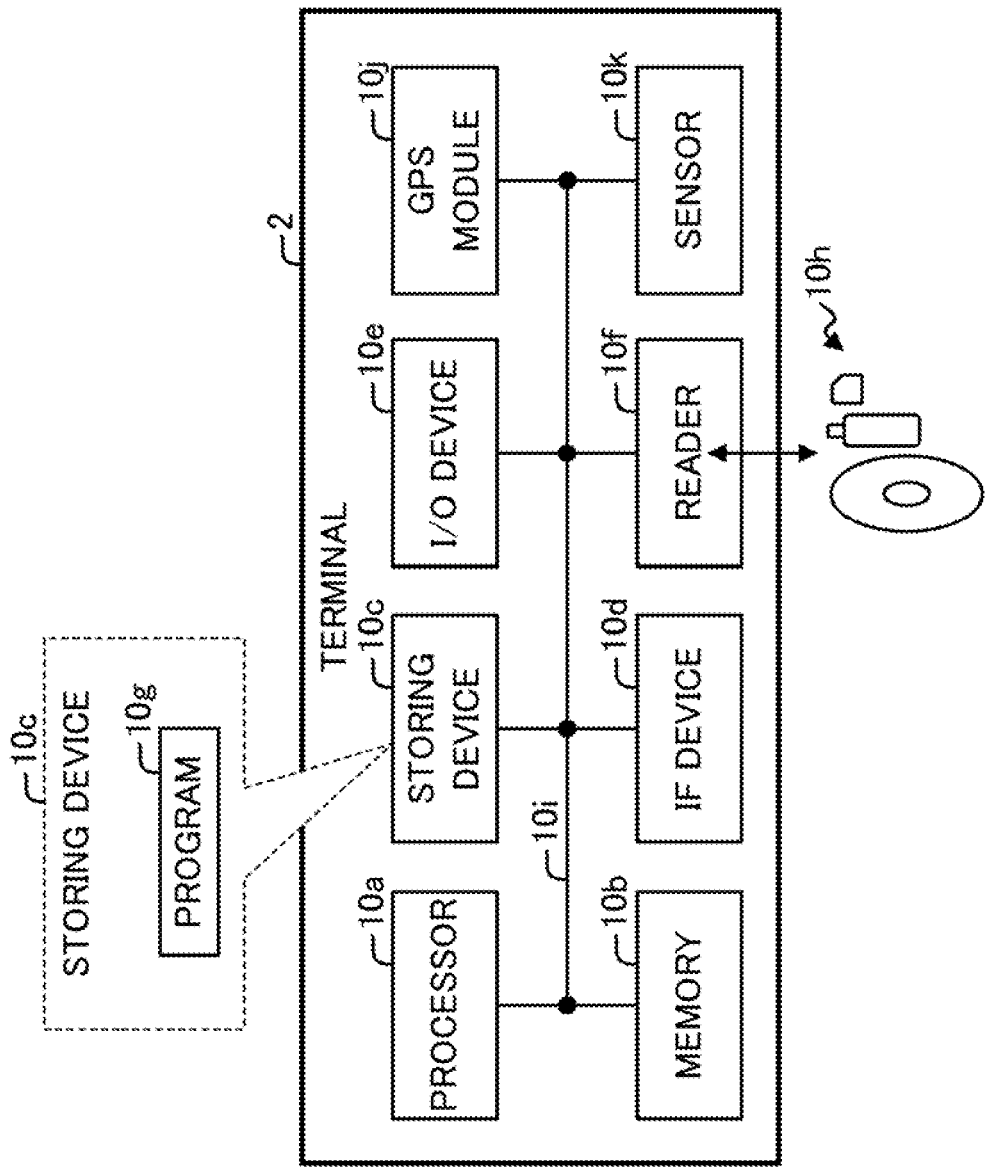
FIG. 7 is a block diagram illustrating an example of the hardware configuration of a terminal serving as a computer.

[1-4] Example of Hardware Configuration:

Next, description will now be made in relation to an example of the hardware (HW) configurations of the terminal 2, information collecting server 3, the cooperation server 4, and the ad distributing server 5. The terminal 2, information collecting server 3, the cooperation server 4, and the ad distributing server 5 may have the same or similar HW configurations. Hereinafter, an example of the HW configuration of the terminal 2, information collecting server 3, the cooperation server 4, and the ad distributing server 5 will be described with reference to an example of the HW configuration of a computer 10. FIG. 6 is a block diagram schematically illustrating an example of the HW configuration of the computer 10, and FIG. 7 is a block diagram schematically illustrating an example of the HW configuration of the terminal 2 serving as the computer 10.

As illustrated in FIG. 6, the computer 10 may illustratively include a processor 10a, a memory 10b, a storing device 10c, an IF device 10d, an I/O (Input/Output) device 10e, and a reader 10f as the HW configuration.

The processor 10a is an example of an arithmetic processing device for performing various controls and arithmetic operations. The processor 10a may be communicably coupled to the blocks in the computer 10 via a bus 10i. The processor 10a may be a multi-processor including multiple processors, a multi-core processor having multiple processor cores, or a configuration having multiple multi-core processors.

Examples of the processor 10a include an integrated circuit (IC) such as a CPU, a Micro Processing Unit (MPU), a Graphics Processing Unit (GPU), an Accelerated Processing Unit (APU), a Digital Signal Processor (DSP), an Application Specific IC (ASIC), and an Field-Programmable Gate Array (FPGA).

The memory 10b is an example of the HW that stores information such as various data and program information. Examples of the memory 10b include a volatile memory such as Dynamic RAM (DRAM).

The storing device 10c is an example of the HW that store information such as various data and program information. Examples of the storing device 10c include a magnetic disk device such as a Hard Disk Drive (HDD), a semiconductor drive device such as a Solid State Drive (SSD), and various storing device such as a non-volatile memory. Examples of the non-volatile memory include a flash memory, a Storage Class Memory (SCM), and a Read Only Memory (ROM).

The storage unit 10c may store a program 10g that achieves all or part of various functions of the computer 10. For example, in the terminal 2, the processor 10a can achieve the function as the terminal 2 by expanding the program 10g stored in the storing device 10c on the memory 10b and executing expanded program 10g. Further, in the information collecting server 3, the processor 10a can achieve the function as the information collecting server 3 by expanding the program 10g stored in the storing device 10c on the memory 10b and executing expanded program 10g. Further, in the cooperation server 4, the processor 10a can achieve the function as the cooperation server 4 by expanding the program 10g stored in the storing device 10c on the memory 10b and executing expanded program 10g. In addition, in the ad distributing server 5, the processor 10a can achieve the function as the ad distributing server 5 by expanding the program 10g stored in the storing device 10c on the memory 10b and executing the expanded program 10g.

The IF device 10d is an example of a communication IF that controls, for example, the connection and communication with the network 6. For example, the IF device 10d may include an adapter compliant with LAN or optical communication (e.g., Fibre Channel (FC)). The adapter may correspond to one or both of wireless and wired communication schemes. For example, the program 10g is downloaded from the network 6 to the computer 10 via the communication IF and stored into the storing device 10c.

The I/O device 10e includes one or both of an input device and an output device.

Examples of the input device include a keyboard, a mouse, a touch panel, a controller (e.g., a game controller or a remote controller), buttons, a 3-Dimension Interface (3D IF), a microphone, and various devices compliant with Natural User IF (NUI).

Examples of the output device include various 2D displays, projectors, 3D displays, and printers. Examples of the 2D display include a liquid crystal display (LCD), a display compatible with plasma, an Organic Light Emitting Diode (organic EL (OLED)), and a micro LED (mLED). Examples of the 3D displays include various displays capable of displaying holograms, projection mappings, Virtual Realities (VR), Augmented Realities (AR), and complex realities (MR; Mixed Reality).

A wearable display may be used as the 2D and the 3D displays. The input device and the output device may be integrally formed as a touch panel.

The reader 10f is an example of a reader that reads data and program data recorded on the recording medium 10h. The reader 10f may include a connecting terminal or device to which the recording medium 10h can be connected or inserted. Examples of the reader 10f include an adapter conforming to Universal Serial Bus (USB) and the like, a drive device for accessing a recording disc, and a card reader for accessing a flash memory such as an SD card. The program 10g may be stored in the recording medium 10h, and the reader 10f may read program 10g from the recording medium 10h and then stores the read program 10g into the staring device 10c.

Examples of the recording medium 10h include a non-transitory recording medium such as a magnetic/optical disk or a flash memory. Examples of the magnetic/optical disk include a flexible disk, a CD (Compact Disc), a DVD (Digital Versatile Disc), a Blu-ray disk, and an HVD (Holographic Versatile Disc). Examples of the flash memory include a USB memory card and an SD card. Example of the CD include a CD-ROM, a CD-R, and a CD-RW. Examples of the DVD include a DVD-ROM, a DVD-RAM, a DVD-R, a DVD-RW, a DVD+R, and a DVD+RW.

The HW configuration of the computer 10 described above is exemplary. Accordingly, the number of HW devices in the computer 10 may be increased or decreased (e.g., addition or deletion of arbitrary blocks), divided, integrated in arbitrary combinations, or the buses may be added or deleted as appropriate.

For example, in each of the information collecting server 3, the cooperation server 4, and the ad distributing server 5, at least one of the I/O device 10e and the reader 10f may be omitted.

The terminal 2 may omit the reader 10f. Further, the terminal 2 may further include a GPS module 10j and a sensor 10k, as illustrated in FIG. 7.

For example, the GPS module 10j is a device or a chip that measures (obtains) latitude and longitude information using a satellite positioning system such as GPS, and is used for obtaining position information of the terminal 2.

The sensor 10k is an example of detecting device capable of detecting at least one of the movement of a terminal 2, a condition of the user having a terminal 2, an environment around a terminal 2, for example. Examples of the sensor 10k include various sensors such as an inertial sensor such as an acceleration sensor and a gyro-sensor, a radio wave sensor such as a Doppler sensor, a blood pressure monitor, a heart rate monitor, a respiration monitor, and a moisture monitor.

[1-5] Example of Functional Configuration:

Next, description will now be made in relation to examples of the functional configurations of the terminal 2, the information collecting server 3, the cooperation servers 4, and the ad distributing server 5. At least some of the functional blocks described below may be provided in the form of a program 10g that the respective processors 10a of the terminal 2, the information collecting server 3, the cooperation server 4, and the ad distributing server 5 expand in the memory 10b and execute. For example, at least some of the functional blocks described below indicate a function of the OS executed by the processor 10a or a function of drivers or software (SW) running on the OS.

[1-5-1] Example of Functional Configuration of Terminal

Figure 8:
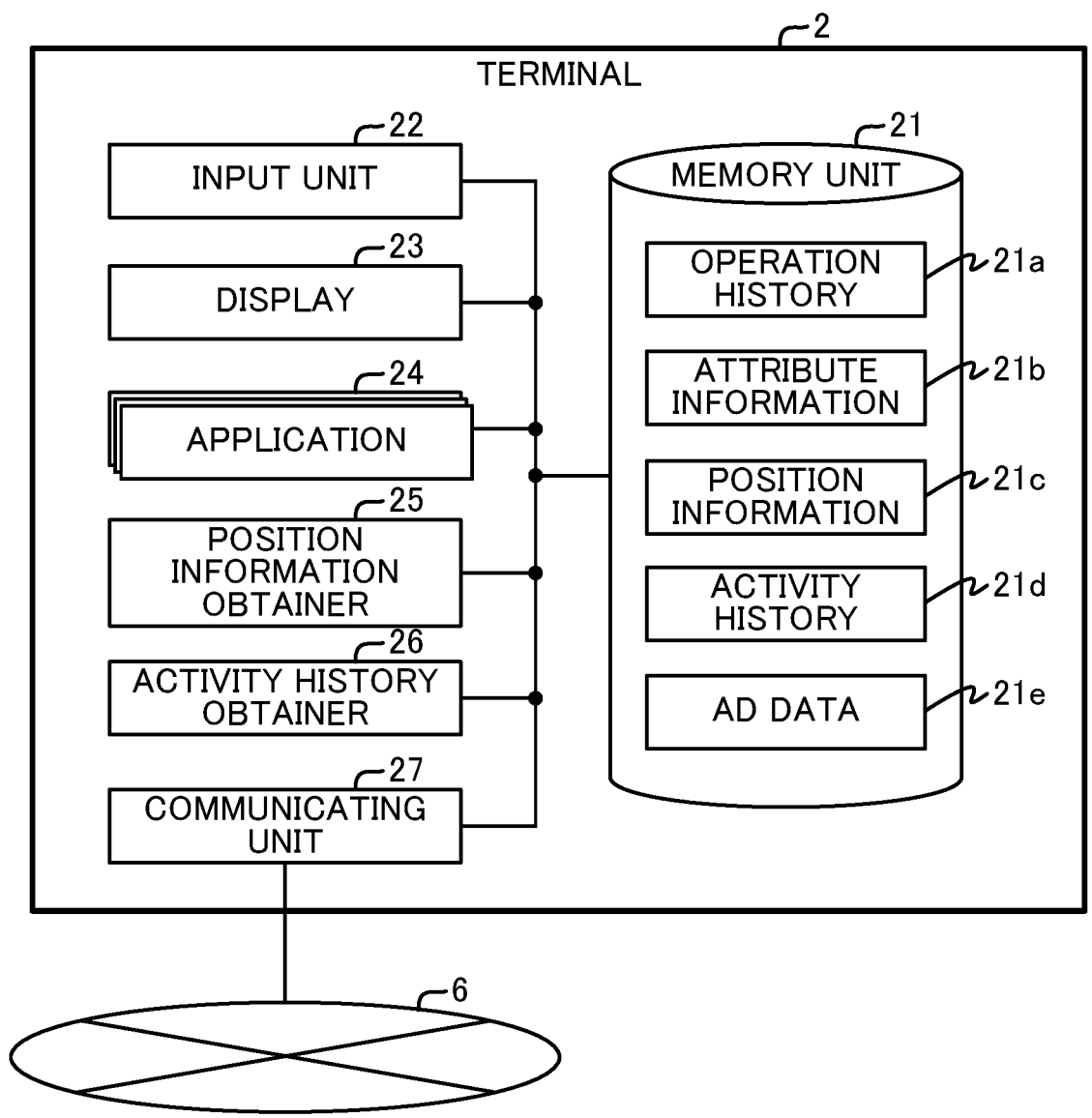
FIG. 8 is a block diagram illustrating an example of the functional configuration of a terminal.

FIG. 8 is a block diagram illustrating an example of the functional configuration of the terminal 2. As illustrated in FIG. 8, the terminal 2 may illustratively comprise a memory unit 21, an input unit 22, a display 23, multiple APPs 24, a position information obtainer 25, an activity history obtainer 26, and a communicating unit 27.

The memory unit 21 is an example of the storing device that stores various pieces of information to be used in the operation of the terminal 2, and in one embodiment, may store the operation history 21a, the attribute information 21b, the position information 21c, and the activity history 21d as information of at least part of the information 5b related to the user. The memory unit 21 may also store advertisement (ad) data 21e received from the ad distributing server 5. The memory unit 21 may be achieved by, for example, a storage area included in the storing device 10c or memory 10b of the terminal 2 (see FIG. 7).

The input unit 22 outputs information input via the input device of the I/O device 10e (see FIG. 7) included in the terminal 2 to the OS or the software (SW). The information input via the input device includes, for example, a letter string, a voice (or a letter string of an analysis result of the voice), data, selected information.

Further, the input unit 22 may store, as an operation history 21a, at least part of information input via the input device into the memory unit 21. The operation history 21a is an example of the "operation history of the terminal 2 operated by the user" described as the above (1). The operation history 21a may illustratively accumulate input data in, for example, the chronological order. The operation history 21*a* may include information about the time at which the input or selection was made, e.g., a time stamp.

Incidentally, the information included in the operation history 21*a* may be limited to the information of the keyword which matches or is related to the keywords stored in, for example, a predetermined keyword list or the like among the input or selected letter string, not to the entire input or selected letter string. The keyword list may be stored in, for example, the memory unit 21 or the information collecting server 3.

The display 23 displays information output from the OS or the SW on the output device of the I/O device 10*e* (see FIG. 7) of the terminal 2. Such information output from the OS or the SW may include ad 1*a* (see FIG. 5) that the communicating unit 27 received from the ad distributing server 5.

The APP 24 is SW that operates on the OS and performs various processes of the terminal 2. Examples of the APP 24 include SW, such as a web browser and an AI assistant, capable of executing a search process, and SW for setting the OS. Other examples of the APP 24 include SW such as scheduling management, e-mail, SNS, map, physical condition management, shopping, photograph management, music and moving image viewing, and various pieces of SW to be described below. In one embodiment, at least some of the functions of the APP 24 may be implemented by one function of the OS.

Among the APPs 24, an APP 24 that handles the information on the attributes of the user may store, as an attribute information 21*b*, the information on the attributes of the user into the memory unit 21. The attribute information 21*b* is one example of the "attributes of the user" described as the above (2). Examples of the APP 24 for handling the information on the attributes of the user include SW for setting the OS, and SW having the information on the attributes as the setting information.

Hereinafter, description will now be made assuming that the terminal 2 searches for web pages by APP 24 exemplified by a web browser or an AI assistant and displays the search result and the ad data 21*e* to be stored in the memory unit 21 on the web browser or the AX assistant. In the following explanation, an APP 24 such as a web browser or an AI assistant is sometimes referred to as a browser 24.

The browser 24 may be a dedicated APP 24 installed, as SW having a function of displaying an ad 1*a*, in an existing terminal 2. Alternatively, the browser 24 may be existing OS or APP 24 of the terminal 2 added with an extended function (plug-in or add-on) for displaying an ad 1*a*.

The function for displaying the ad 1*a* may additionally include, for example, a function for causing the OS, the web browser, the AI assistant, and the audio search function to transmit information 5*b* related to the user to the server, as will be described below. The function for displaying the ad 1*a* may include a function of causing, for example, the browser 24 to display the ad data 21*e* stored in the memory unit 21 as the ad 1*a*.

The position information obtainer 25 obtains the position information 21*c* of the terminal 2, e.g. the latitude and the longitude, by means of the GPS module 10*j* of the terminal 2 (see FIG. 7), and stores the obtained position information 21*c* into the memory unit 21. The position information 21*c* is an example of the "position information" of the "activity information of the user" described as the above (3). The position information 21*c* may include information about the time at which the latitude and the longitude were obtained, e.g., a time stamp.

The activity history obtainer 26 obtains the activity history 21*d* of the terminal 2 and stores the obtained activity history 21*d* into the memory unit 21. The activity history 21*d* is an example of the "activity history" of the "activity information of the user" described as the above (3). For example, the activity history obtainer 26 may obtain at least one piece of information of the following examples (a) to (h) as the activity history 21*d*. The activity history 21*d* may include information about the time at which the activity history 21*d* is obtained, e.g., a time stamp.

(a) Exercise History of User:

The activity history obtainer 26 may obtain the history of the exercise of the user, such as walking or running, by estimating the movement of the terminal 2 worn (fixed) on, for example, the user's body, clothing, on the basis of the detected values of the sensor 10*k* (see FIG. 7) provided in the terminal 2. Examples of the sensor include an inertial sensor and a radio wave sensor.

The activity history obtainer 26 may obtain the exercise history of the user on the basis of the position information 21*c* or an APP 24 for scheduling management, SNS, photograph management, or a map, for example. In this APP 24, information related to exercise can be recorded (inputted) by the user.

(b) Vital History:

The activity history obtainer 26 may obtain vital (biometrics) information of the user on the basis of detected values of a microphone as an inputting device or a sensor 10*k* exemplified by a blood pressure monitor, a heart rate monitor, a respiratory monitor, or a water monitor. Examples of the vital information include sleep time, breathing pattern, blood glucose level, blood pressure, heart rate, sweating, and body temperature.

(c) Movement History:

The activity history obtainer 26 may obtain a the movement history based on, for example, detected values of, for example, an acceleration sensor, and a radio sensor, the position information 21*c* or an APP 24 for scheduling management, SNS, photograph management, or a map. In such an APP 24, the user can record (input) information on the movement.

(d) Meal History:

The activity history obtainer 26 may obtain the meal history based on, for example, an APP 24 for scheduling management, SNS, photograph management, or a map. In such an APP 24, information on meals can be recorded by the user.

(e) Purchase History:

The activity history obtainer 26 may obtain a purchase history based on, for example, the browser 24, and an APP 24 for shopping, management of credit card, electronic money management, asset management, household management, or receipt management. Alternatively, the activity history obtainer 26 may also obtain a purchase history based on, for example, an APP 24 for SNS or photograph management in which information related to purchase may be recorded (inputted) by the user.

(f) Coupon Use History:

The activity history obtainer 26 may obtain a coupon use history based on, for example, an APP 24 for managing coupons used in stores such as real stores or online shops, the browsers 24, or an APP 24 for shopping. Alternatively, the activity history obtainer 26 may also obtain coupon use histories based on, for example, an APP 24 for SNS or photograph management in which information about coupon use can be recorded (inputted) by the user.

(g) Ticket Purchase History:

The activity history obtainer 26 may obtain purchase history of various tickets of, for example, concerts, movie theaters, art museums, performances, amusement parks, aquariums based on, for example, the browser 24 or an APP 24 for shopping. Alternatively, the activity history obtainer 26 may also obtain a ticket purchase history on the basis of, for example, an APP 24 for SNS, photograph management, in which information about the purchase of the ticket can be recorded (inputted) by the user.

(h) Speech Content:

The activity history obtainer 26 may acquire the speech content such as voice, conversation, and utterance with a microphone or another device provided in the terminal 2.

The communicating unit 27 communicates with various servers connected to the network 6, using the IF device 10d of the terminal 2.

For example, the communicating unit 27 transmits an operation history 21a or the like of the information 5b related to the user to the information collecting server 3. As a result, the "operation history of the terminal 2 operated by the user" and the like described above as (1) are stored in the information collecting server 3.

The communicating unit 27 may communicate with the PDS server 7 and the server 8 for operating the OS and the APP 24. In the communication, the communicating unit 27 may transmit the attribute information 21b, position information 21c, and the activity history 21d to the PDS server 7 and the server 8. As a result, the "attributes of the user" described as above (2), the "user's activity information" described in (3) above, and the like are stored in the PDS server 7 and the server 8.

Furthermore, the communicating unit 27 performs communication with the web server or the ad distributing server 5 for displaying the web page on the display 23 by the browser 24. By the communication, a web page or the like including the ad 1a may be displayed on the display 23.

Upon receiving of the advertisement data from the ad distributing server 5, the communicating unit 27 may store the received ad data 21e into the memory unit 21. The ad data 21e may be transmitted from the ad distributing server 5, for example, at regular intervals or at given timings. An example of such a timing is a timing at which given processing, such as executing searching process by the browsers 24, is performed by the APP 24.

In the information 5b related to the user, the APP 24, the position information obtainer 25 and the activity history obtainer 26 may omit the obtaining of information that can be acquired by servers other than the terminal 2, for example, information such as the attribute information 21b and activity history 21d (e.g., purchase history).

Figure 9:
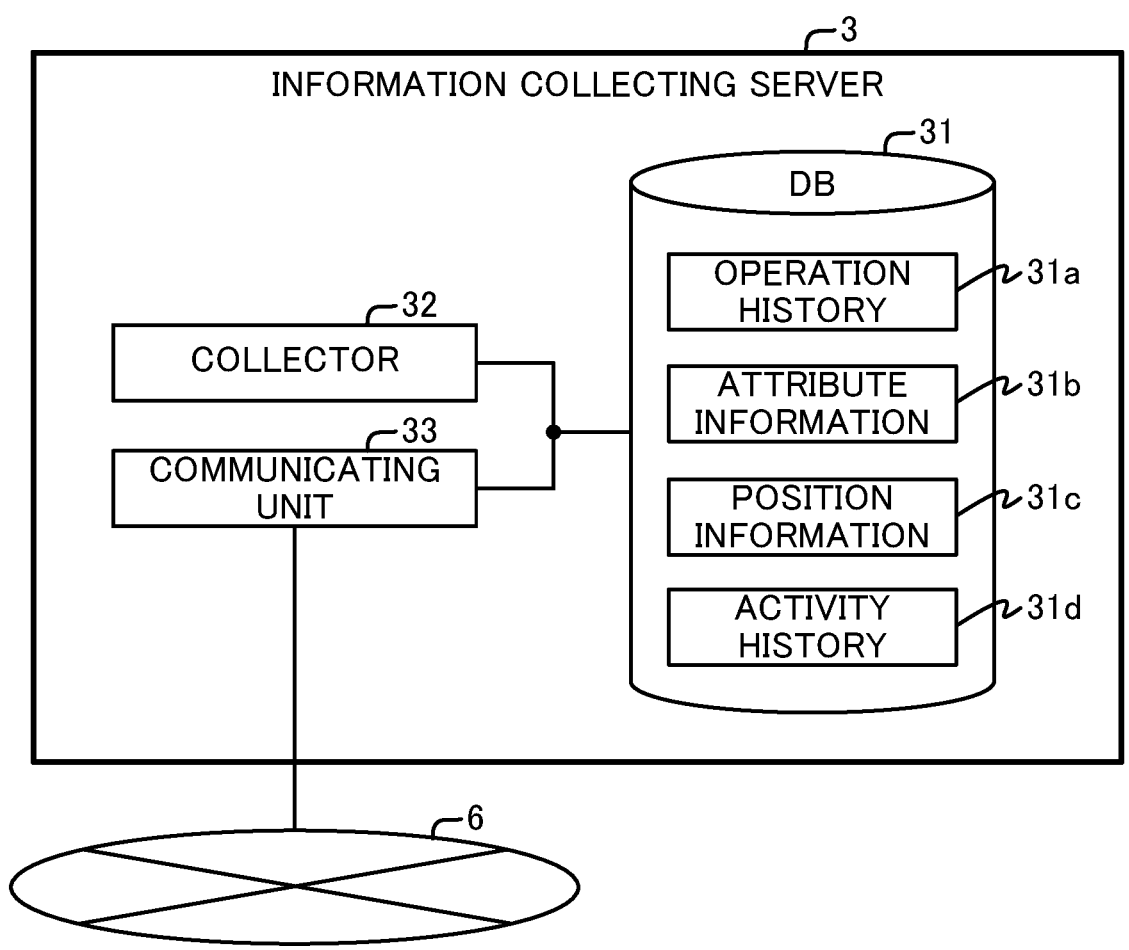
FIG. 9 is a block diagram illustrating an example of the functional configuration of an information collecting server.

[1-5-2] Example of Functional Configuration of Information Collection Server:

FIG. 9 is a block diagram illustrating an example of the functional configuration of the information collecting server 3. As illustrated in FIG. 9, the information collecting server 3 may illustratively comprise a DB 31, collector 32 and a communicating unit 33.

The DB 31 is an example of the storing device for storing information 5b related to the user, and in one embodiment may store, as the information 5b related to the users, the operation history 31a, the attribute information 31b, the position information 31c, and the activity history 31d for each user or each terminal 2. The DB 31 may be achieved by, for example, a storage area included in the storing device 10c or the memory 10b of the information collecting server 3 (see FIG. 6). The DB 31 may be provided in another server in place of the information collecting server 3.

The collector 32 collects information 5b related to the user from each of the terminal 2, the cooperation server 4 (the PDS server 7), and the server 8 via the communicating unit 33 and stores the collected information 5b into the DB 31.

For example, the collector 32 may receive an operation history 21a from the terminal 2 and store the obtained operation history 21a into the DB 31 in the form of being associated with the terminal 2 (the user).

The collector 32 may also receive the attribute information 21b, the position information 21c, and the activity history 21d from the cooperation server 4 (the PDS server 7) or the server 8 and store them in the DB 31 as an attribute information 31b, position information 31c and activity history 31d associated with the terminal 2.

The communicating unit 33 mutually communicates with each of the terminals 2, the cooperation server 4, the ad distributing server 5, and the server 8 connected to the network 6 by using an IF device 10d provided in the information collecting server 3.

For example, the communicating unit 33 communicates with each of the terminals 2, the cooperation server 4, and the server 8 for the operation of the collector 32. For example, the communicating unit 33 may receive operation history 21a transmitted sequentially from the terminal 2. In addition, the communicating unit 33 may transmit a request for obtaining the information 5b related to the user to the cooperation server 4 and the server 8 at regular intervals, and may receive the information transmitted in response to the request.

The communicating unit 33 also transmits the operation history 31a, the attribute information 31b, the position information 31c, and the activity history 31d that are to be stored into the DB 31 in response to a request from the ad distributing server 5. The information to be transmitted to the ad distributing server 5 may be information of a change (difference) from the last transmitted information. The communicating unit 33 may transmit the content of the operation history 31a to the ad distributing server 5 each time the operation history 31a is collected (received) from the terminal 2.

Figure 10:
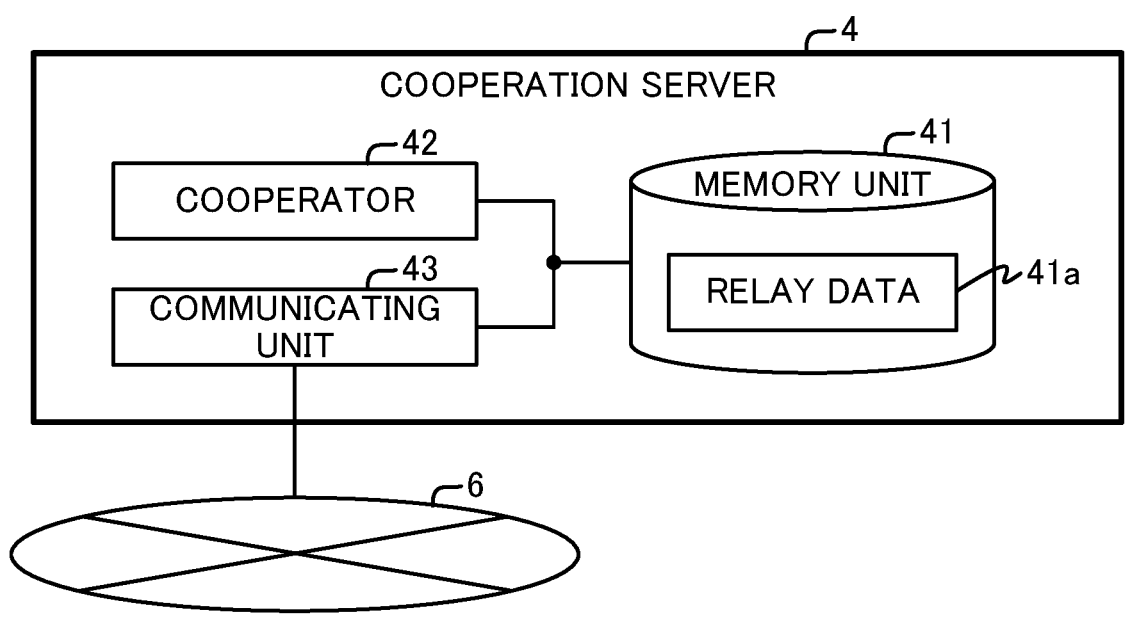
FIG. 10 is a block diagram illustrating an example of the functional configuration of a cooperation server.

[1-5-3] Example of Function Configuration of a Cooperative Server:

FIG. 10 is a block diagram schematically illustrating an example of the functional configuration of the cooperation server 4. As illustrated in FIG. 10, the cooperation server 4 may illustratively include a memory unit 41, a cooperator 42 and a communicating unit 43.

The memory unit 41 is an example of a buffer for storing relay data 41a to be relayed from the PDS server 7 to the information collecting server 3. The relay data 41a may include, for example, information related to the attributes and the activity history information of the user received from the PDS server 7. The memory unit 41 may be implemented by, for example, a storage area of the storing device 10c or the memory 10b (see FIG. 6) of the cooperation server 4.

The cooperator 42 receives information 5b related to the user from the PDS server 7 via the communicating unit 43 and stores the information 5b into the memory unit 41 as relay data 41a. The cooperator 42 also reads the relay data 41a from the memory unit 41 and transmits the relay data 41a to the information collecting server 3 via the communicating unit 43.

The communicating unit 43 mutually communicates with each of the information collecting server 3 and the PDS server 7 that are connected to the network 6 by using the IF device 10d provided in the cooperation server 4.

For example, the communicating unit 43 communicates with each of the information collecting server 3 and the PDS server 7 for operation of the cooperator 42. In one instance, the communicating unit 43 may send the relay data 41a as the information 5b related to the user to the information collecting server 3 in response to an obtaining request issued from the information collecting server 3. In addition, the communicating unit 43 may transmit a request for obtaining the information 5b related to the user to the PDS server 7 at regular intervals, and may receive information 5b transmitted in response to the request.

Figure 11:
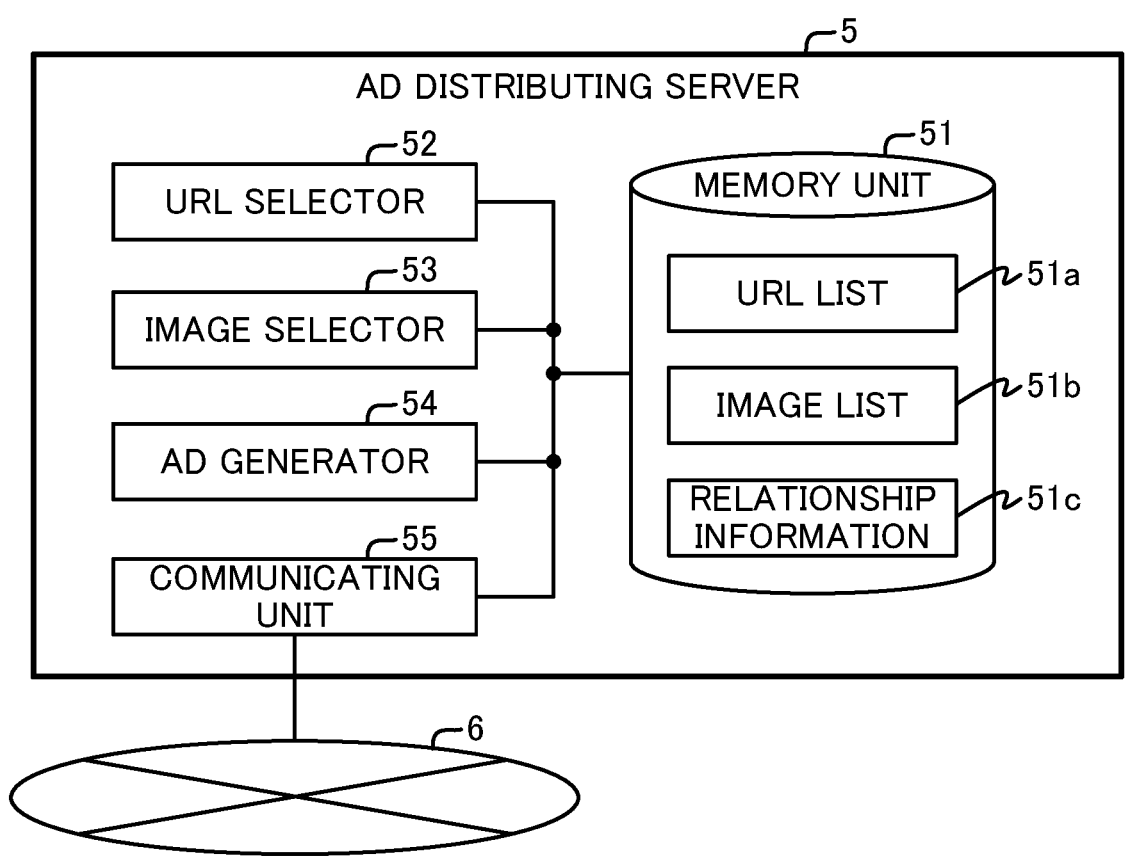
FIG. 11 is a block diagram illustrating an example of the functional configuration of an ad distributing server.

[1-5-4] Example of Functional Configuration of Ad Distributing Server;

FIG. 11 is a block diagram schematically illustrating an example of the functional configuration of the ad distributing server 5. As illustrated in FIG. 11, the ad distributing server 5 may illustratively include a memory unit 51, a URL selector 52, an image selector 53, an ad generator 54, and a communicating unit 55. At least some of the functions of the URL selector 52, the image selector 53, the ad generator 54, and the communicating unit 55 may be implemented as functions of the AI 5a (see FIG. 5).

The memory unit 51 is an example of a storing device for storing various pieces of information used in the operation of the ad distributing server 5, and in one embodiment, may store the URL list 51a, the image list 51b, and the relationship information 51c. The memory unit 51 may be achieved by, for example, a storage area included in the storing device 10c or memory 10b of the ad distributing server 5 (see FIG. 6).

Figure 12:
FIG. 12 is a diagram illustrating an example of a URL list.

FIG. 12 is a diagram illustrating an example of the URL list 51a. The URL list 51a is an example of address management information for managing storing destination addresses of multiple contents related to multiple products. As illustrated in FIG. 12, the URL list 51a may include an ID (Identifier), which is an example of the identification information of a storing destination address, a URL, which is an example of the storing destination address, and a category, which is an example of information related to the type (category) of the storing destination address.

An ID is information capable of identifying the URL of the content. In the example of FIG. 12, the advertiser ("aaa", "bbb", etc.) and the URL of the content ("1" following "aaa" or "bbb", etc.) can be identified by the ID. A URL is a URL of a web page related to a product.

In the category, one or more keywords related to product attributes (which may be regarded as a "search condition") may be set which are exemplified by name, type, genre, manufacturer, price zone, and store location of the product, which are used for determining the product and URLs as the subject of the ad 1a to be displayed on the terminal 2. In the example of FIG. 12, as the category of the ID "aaa1", information such as "vehicle" representing the category of the product, "AA1" representing the product name, and "aaa" representing the advertiser (manufacturer) are set. In the URL list 51a, the items in the category may be omitted.

In the above-described URL list 51a, the URLs of multiple products of the candidate for the ad 1a may be set in advance, which may be appropriately updated in accordance with addition, deletion, or change of entries, URLs, categories, for example.

FIG. 13 is a diagram illustrating an example of the image list 51b. The image list 51b is an example of image management information for managing multiple images related to multiple products. As illustrated in FIG. 13, the image list 51b may include an ID, which is an example of the identification information of an image, a URL, which is an example of image storing destination address, a URLID, which is an example of the identification information of the contents of a product represented by the image, and a tag, which is an example of information about the feature of the image. The ID is information capable of uniquely identifying an image.

The URL is a URL of a storing destination of an image, for example, a still image or a moving image. The image may be provided by, for example, an advertiser or an advertisement agency, or may be an image obtainable from other servers connected to the network 6, for example, the Internet. For example, a URL of a server of an advertiser, a server of an advertisement agency, or another server may be set in the URL. Alternatively, in cases where the images are stored in the ad distributing server 5 or in a server or a storage in a private network of the ad distributing server 5, the URLs may be set to be with file paths to the server or the storage in a private network of the ad distributing server 5.

An URLID may be set to be an ID of the URL list 51a that specifies an entry included in the URL list 51a. The example of FIG. 13 means that a URL of the advertisement page represented by the image of the ID "xxx2" is specified by the ID "aaa1" (see FIG. 12).

In a tag, one or more keywords related to features (which may be regarded as "search conditions") of the image used to select an image to be associated with the product and the URL may be set which feature are exemplified by name, color, pattern, background, location, timing, mood, impression, and an event of an object displayed on the image. In the example of FIG. 13, information such as "seaside" (location), "summer" (timing), and "drive" (status) are set to be the tags of the ID "xxx2".

In cases where the features, product name, or the like of the image can be determined through image analysis by the AI 5a, one or both of the URLID and the tag may be omitted in the image list 51b.

In the above-described image list 51b, the information related to multiple images may be set in advance, which may be appropriately updated in accordance with addition, deletion, or change of entries, URLs, and tags, for example.

Furthermore, the image related to a product may be generated by combining (processing) a base image, e.g., an image representing the image of the product per se or an image of the product, and an ancillary image such as foreground, background, object, decoration, letter, or image effects. In this instance, in the image list 51b, the URLs of one or more base images may be set for one URLID and the URLs of two or more ancillary images that can be combined with and not linked to the URLID may be set.

Figure 14:
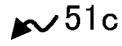
FIG. 14 is a diagram illustrating an example of relationship information.

FIG. 14 is a diagram illustrating an example of the relationship information 51c. The relationship information 51c indicates relationships among multiple items (e.g., keywords). As illustrated in FIG. 14, the relationship information 51c may illustratively include multiple (e.g., two) of items. The multiple items in each entry is an example of information for understanding the world.

For example, when the "musician A" is promoting the beverage "BBS", multiple users who are fans of the "musician A" tend to purchase the "BBB". In such a case, as illustrated in FIG. 14, "musician A", and "beverage" and a product name "BBB" of the beverage are set in association with one another in the relationship information 51c.

In addition, for example, in cases where "travel" by a "ferry" on "route W" allows the user to stay in the cabin together with his/her "pet", multiple users who have "pets" have a strong tendency to travel on the "route W". In such a case, as illustrated in FIG. 14, "pet", "route W", "travel", and "ferry" are set in association with one another in the relationship information 51c.

The relationships between the items as illustrated in FIG. 14 may be obtained from a learned model (relationship model) constructed by analyzing information in the world by the AI 5a (e.g., machine learning). This eliminates the requirement of the memory unit. 51 for storing the relationship information 51c.

For example, as described above, the information 5b related to the user is stored in the information collecting server 3 for each user. In addition, information for understanding the world can be obtained from various web servers connected to the network 6 such as the Internet. For this reason, the AI 5a may construct relationship models in which relationships between items as illustrated in FIG. 14 are obtained, for example, through analysis using at least one of information 5b related to multiple users and information obtained from a web server or the like as inputs.

The information for understanding the world described above is an example of information related to a group to which a user belongs. In the example illustrated in FIG. 14 can be assumed to represent a group that multiple users who are fans of "Musician A" belong to and a group that multiple users who have (or not have) "pets" belong to.

An example of a group that the user belongs to includes a group composed of multiple users including the user. Such a group may include, for example, an explicit group, such as circles or organizations, that the users subscribe or participate, and a potential group in which at least one type (e.g., hobby) of information 5b related to the user is common, as illustrated in FIG. 14. A potential group may include, for example, the region (e.g., the town, prefecture, state, or country in which the user resides) that the user belongs to, or multiple users who reside in the region.

The information related to the group that the user belongs to may be exemplified by information related to epidemic, trend, promotion, campaign, event, climate, region, incident, accident, or environment such as natural environment or living environment in the group.

The relationship information 51c or relational models described above may, for example, be set or constructed in the generation phase and may be appropriately updated at regular intervals or in line with the updating of the information 5b.

The URL selector 52 is an example of the first, obtaining unit that obtain a storing destination address of the contents related to a product determined as a subject of the advertisement to be displayed on the basis of at least one of the operation history of a terminal 2 operated by a user, the attributes of the user, and the activity information of the user.

For example, in the model generation phase, the URL selector 52 may construct a URL selection model for selecting a URL by analyzing (e.g., machine-learning) the information 5b related to the user (learning data) received from the information collecting server 3 as inputs.

In the operational phase using a URL selection model (the phase of advertisement distribution), the URL selector 52 receives the information 5b related to the user from the information collecting server 3. Then, by giving the information 5b to the URL selection model, the URL selector 52 selects, from the URL list 51a, the product of the subject of the ad 1a to be displayed on the terminal 2 of the user, and the storing destination address of the content related to the product.

The URL selector 52 may receive, as the information 5b related to the user, at least one of the operation history 31a, the attribute information 31b, the position information 31c, and the activity history 31d from the information collecting server 3. As the operation history 31a, the information exemplified by the letter strings, or sounds input as a search words into the browsers 24 of the terminal 2 may be sequentially (e.g., in conjunction with) transmitted from the terminal 2 to the ad distributing server 5 via the information collecting server 3.

In the operation phase, the URL selector 52 may start selecting the storing destination address at a given timing, such as a timing at which the information 5b related to the user is received from the information collecting server 3, or at a regular intervals.

The image selector 53 is an example of the second obtaining unit that obtains a still image or a moving image related to the product.

For example, in the model generation phase, the image selector 53 may construct an image selection model for selecting an image by analysis (e.g., machine-learning) using the information 5b related to the user (learning data) received from the information collecting server 3 as inputs.

In the operation phase (advertisement distributing phase) using an image selection model, the image selector 53 receives information 5b related to the user from the information collecting server 3. The image selector 53 then selects an image related to the product (contents) selected by the URL selector 52 from the image list 51b by providing the information 5b to the image selection model for image selection.

The image selector 53 may select an image related to the product selected by the URL selector 52 and also to be a base image. In this case, the image selector 53 may generate an image related to the product by selecting an ancillary image from the image list 51b to be combined with the selected base image in the image selection model and combining the selected base image and the ancillary image.

Alternatively, the image selector 53 may generate an image related to the product by a learned model for automatically generating the image on the basis of the information 5b related to the user and the product information selected by the URL selector 52.

The ad distributing server 5 may construct a model in which at least one of the URL selection model and the image selection model is integrated.

In the above explanation, the URL selector 52 and the image selector 53 select a URL and an image based on the information 5b related to the user, but the present invention is not limited to this. Alternatively, the URL selector 52 and image selector 53 may select URLs and images based on relationship models in addition to or instead of information 5b related to the user.

The URL selector 52 may determine the product of the subject of the ad 1a to be displayed on the basis of the information 5b related to other users (second users) belonging to the group that the user (first user) belongs to and that is generated in advance. Then, the URL selector 52 may obtain the storing destination addresses of the contents related to the determined product.

For example, by giving the information 5b related to the user (first user), in the form of an input, to the relationship model, the URL selector 52 selects, from the URL list 51a, the product of the subject of the ad 1a to be displayed on the terminal (first user terminal) 2 of the user (first user) and the storing destination address of the contents related to the product.

As described above, the information related to the group that the user (first user) belongs to is obtained on the basis of the information 5b related to the user (first user) and information 5b related to other users (second users) belonging to the group that the user (first user) belongs to and that is generated in advance. Therefore, it can be said that the process of selecting the product and the storing destination address using the relationship model is performed based on the information 5b related to other users belonging to the group that the user belongs to.

In other words, the URL selector 52 determines a product common to multiple other users as a subject of the ad 1a based on at least one of the operation history of the terminals (second user terminals) 2 of the multiple other users belonging to the group, the attributes of the multiple other users, and the activity information of the multiple other users.

The image selector 53 may obtain images related to the product based on the information 5b related to other users belonging to the group that the user belongs to and that is generated in advance.

For example, the image selector 53 may select images related to the product selected by the URL selector 52 by giving the information 5b related to the user to the relational models as inputs.

The ad generator 54 is an example of the generating unit that generates advertisement data by associating the obtained storing destination addresses with a still image or a moving image.

For example, the ad generator 54 generates the advertisement data by associating the URL of the advertisement page selected by the URL selector 52 with the URL of the images obtained (e.g., selected or generated) by the image selector 53.

The advertisement data may be, for example, display data in which an image and a storing destination address serving as a transition destination when the image is selected (clicked or tapped) are associated with each other. By way of an example, the advertisement data may be information about a layout for displaying the ad 1a, or at least part of the source code of a web page, etc. The advertisement data may be the URL of the advertisement page and the URL of the image itself.

In this manner, the URL selector 52, image selector 53 and the ad generator 54 can edit the ad 1a on the basis of the analyzed results of the information 5b related to the user and/or other users.

The communicating unit 55 is an example of the display controlling unit that displays the advertisement data generated by the ad generator 54 on the terminal 2. The communicating unit 55 communicates with each of the terminal 2 and the information collecting server 3 connected to the network 6 using an IF device 10d provided in the ad distributing server 5.

For example, the communicating unit 55 carries out communication to obtain for information 5b related to the user from the information collecting server 3. For example, the communicating unit 55 may transmit a request for obtaining information 5b related to the user to the information collecting server 3 at regular intervals, and may receive the information 5b transmitted in response to the request for obtaining. Alternatively, the communicating unit 55 may receive an information 5b, such as an operation history 31a, appropriately transmitted from the information collecting server 3.

The communicating unit 55 may also transmit the advertisement data to the terminal 2 when the ad generator 54 generates the advertisement data.

As described above, the URL selector 52 starts selecting the storing destination address at the timing of receiving the operation history 31a or the like from the information collecting server 3. Therefore, the advertisement data transmitted from the communicating unit 55 is received by the terminal 2 in the course of the search by, for example, the browser 24. Accordingly, the ad distributing server 5 can present (propose) an ad 1a highly relevant to the search content to the terminal 2.

[1-6] Examples of Generating and Displaying Advertisements According to One Embodiment:

Next, an example of ad 1a generating and an example of ad 1a displayed on the terminal 2 according to the information 5b related to the user in the above-described ad distributing system 1 will be described.

Example 1 of Generating Ad 1a

This example assumes that the user is traveling back and forth on a commuting route from home to a work place on a weekday, and is going out to a specific destination other than the work place on a holiday. These pieces of the above information is specified based on, for example, the attribute information 31b, the position information 31c, and the activity history 31d.

In such cases, in cases where receiving an operation history 31a containing, in the category, "fashion", the URL selector 52 may select, for example, from the URL list 51a, the URL of an entry (product) containing "fashion". The URL selector 52 may select, for example, a URL of an entry containing one or more keywords having high relevance to the purchase history and the destination of holidays (e.g., the pricing zone with a high tendency to purchase, and/or the location of a store) obtained from the position information 31c or the activity history 31d, in the category.

Further, the image selector 53 may select, from the image list 51b, a URL of an entry (image) URLID of which matches the ID of the URL selected from the URL list 51a, as an image related to the product selected by the URL selector 52. The image selector 53 may select, for example, a URL of an entry containing one or more keywords (such as designs and colors) which are highly relevant to hobby and the preferences obtained from the attribute information 31b in the tag.

The ad generator 54 generates advertisement data by combining the URL and the URLs of the images thus selected of the prospective advertisement pages, and transmits the advertisement data to the terminal 2 via the communicating unit 55.

In the terminal 2, the ad data 21e is (temporarily) stored in the memory unit 21, and the ad 1a is displayed on the search result window of the searching process by the browser 24.

Example 2 of Generating Ad 1a

This example assumes that the user is diabetic or prediabetic. Such information can be sometimes specified based on the detected values of the components in sweats and salivary (e.g., blood sugar levels) with sensor 10k or the like in the activity history 31d.

In such a case, the URL selector 52 may select, for example, from the URL list 51a, a URL of an entry (product) that include, in the category, "Diabetes Test Kits" that are highly relevant to the detected value of the sensor 10k. Alternatively, the URL selector 52 may select, from the URL list 51a, a URL of an entry of food and beverage containing, in the category, keywords (e.g., "no sugar") highly relevant to the meal history of the activity history 31d (e.g., if the meal history includes a carbohydrate-rich meal).

Further, the image selector 53 may select, from the image list 51b, a URL of an entry (image) having URLID matching the ID of the URL selected from the URL list 51a as an image related to the product selected by the URL selector 52. The image selector 53 may select, for example, a URL of an entry containing one or more keywords (e.g., hospital, etc.) that are highly relevant to the movement history (e.g., if the user is not attending hospitals) in the activity history 31d in the tag.

As in the present embodiment, the URL selector 52 may generate the ad 1a based on information other than the operation history 31a, in other words, at a timing other than the timing of a searching process by the browser 24. In this case, the advertisement data generated by the ad generator 54 and transmitted from the communicating unit 55 to the terminal 2 may be displayed in a given notification area of the display 23 of the terminal 2 by the browser 24, the OS, or the APP 24.

Example 3 of Generating Ad 1a

This example assumes that the user is a fan of "musician A" (see FIG. 14). Such information is specified on the basis of, for example, the hobbies of the attribute information 31b, the purchase history of goods in the activity history 31d, the ticket purchase history of, for example, a concert.

In cases where receiving an operation history 31a containing "musician A", the URL selector 52 may select, for example, from the URL list 51a, an entry (product) containing "musician A" in the category. Further, the URL selector 52 may select, for example, a URL of an entry containing a keyword highly related to the "BBB" associated with the "musician A" in the relationship model from among the selected entries.

The image selector 53 may also select, from the image list 51b, a URL of an entry containing, in the tag, a keyword that is highly relevant to the hobby in the attribute information 31b or "BBB" obtained from the relationship model, as the image related to the product selected by the URL selector 52. For example, the image selector 53 may select, from the image list 51b, the URL of an entry (e.g., an image for advertisement) containing "musicians A" and "BBB".

Example 4 of Generating Ad 1a

This example assumes that the user keeps a "pet" (see FIG. 14). Such information may be specified on the basis of the family in the attribute information 31, or the purchase history of a pet in the activity history 31d, for example.

In this case, if receiving an operation history 31a containing "travel" and "ferry", the URL selector 52 may select, for example, from the URL list 51a, an entry (product) that includes "travel" and "ferry" in the category. In addition, the URL selector 52 may select, from the selected entries, for example, a URL of an entry containing a keyword that is highly relevant to the "route W" associated with "pet" which is a family member of the user in the relation model.

Further, the image selector 53 may select a URL of an entry containing, in the tag, a keyword that is highly relevant to a family among the attribute information 31b from the image list 51b as an image related to the product selected by the URL selector 52. For example, the image selector 53 may select a URL of an entry (e.g., an image for advertisement) that contains "pet" and "ferry" from the image list 51b.

As described above, by using the relationship model, for example, it is possible to propose an ad 1a for giving "notice" to a user who is a fan of "musician A" but has never drank "BBB" or a user who wants to travel by a ferry but does not know the existence of the "route W" that can be spent in the cabin together with his/her "pet".

In other words, it is possible to propose a product which is a product outside "the range visible to the user" and which is likely to be interested or interested by the user, on the basis of the information 5b related to other users belonging to the groups that the user belongs to.

Thereby, it is possible to generate a more personalized Web advertisement, e.g., the ad 1a that is attractive to the user. In addition, since this enhances the conversion rate of the ad 1a, the resource efficiency in at least one of the terminal 2, network 6 and the ad distributing server 5 can be improved.

Example 1 of Displaying Ad 1a

Figure 15:
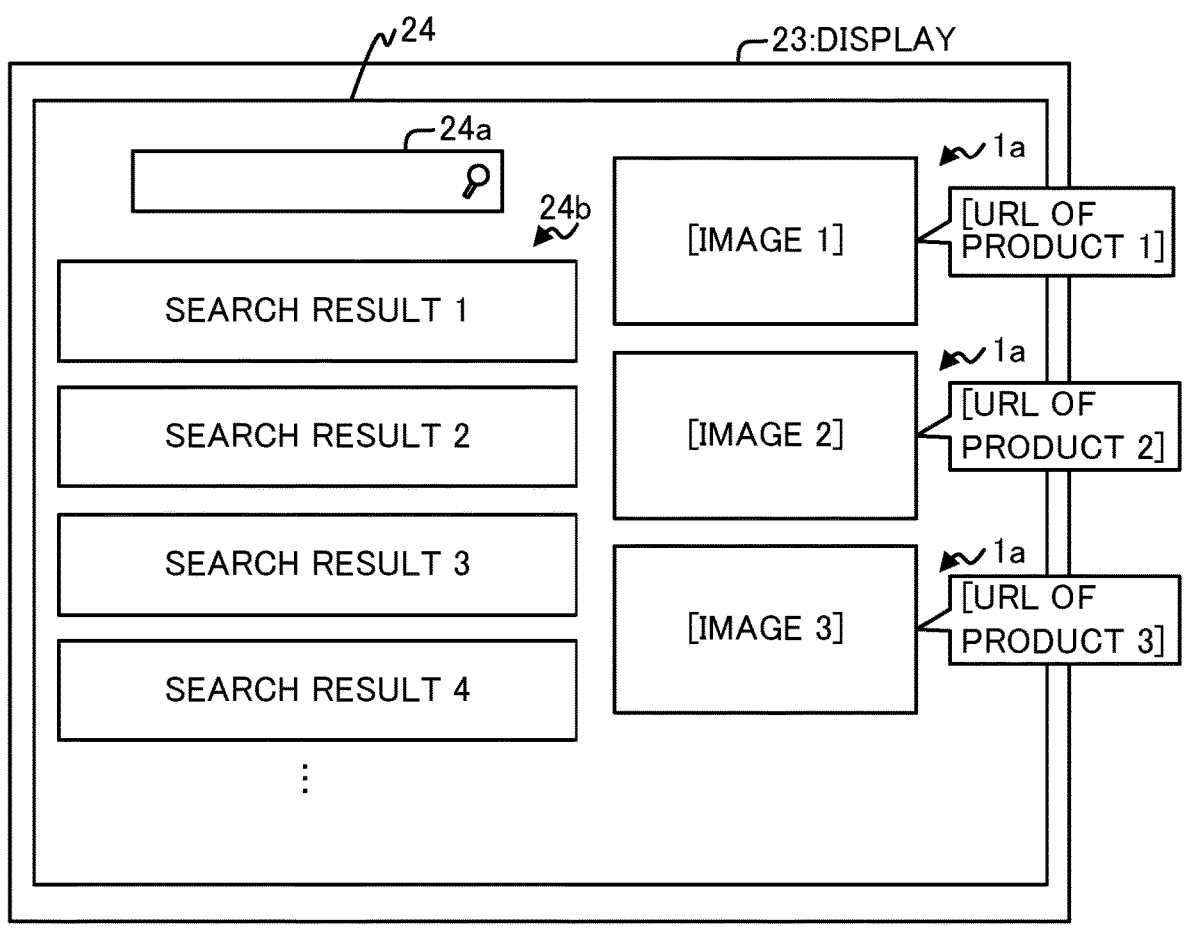
FIG. 15 is a diagram illustrating an example of displaying an advertisement on a display unit of a terminal.

FIG. 15 is a diagram illustrating an example of displaying the ad 1a on the display 23 of the terminal 2. As illustrated in FIG. 15, the ad 1a may be displayed, in the display area of the browser 24, along with the input area 24a of a search letter string and the display area 24b of a search result.

The number, position, size, and the like of the ad 1a (advertisement frames) in the browser 24 are not limited to the examples illustrated in FIG. 15, and may be determined according to, for example, the setting of the terminal 2 or the browser 24, or the screen size of the display 23.

Example 2 of Displaying Ad 1a

In one embodiment, the ad 1a may be displayed at a timing other than the timing at which a result of search by the browser 24 is displayed.

For example, the ad 1a may be displayed on at least one of the four sides, the four corners, and the center of the screen of the display 23 screen at a given timing. The given timing may be any timing, such as a timing at which the ad data 21e is received from the ad distributing server 5, at regular intervals or a timing set by a terminal 2 or the ad distributing server 5.

Example 3 of Displaying Ad 1a

In the above description, the storing destination address is exemplified by a URL of an ad page. The URL of an advertisement page is a web page for advertising a product provided by, for example, an advertiser, an advertisement agency, or the ad distributing server 5.

In one embodiment, a multi-level hierarchical advertisement page may be used so that another ad 1a is further displayed on the advertisement page.

Figure 16:
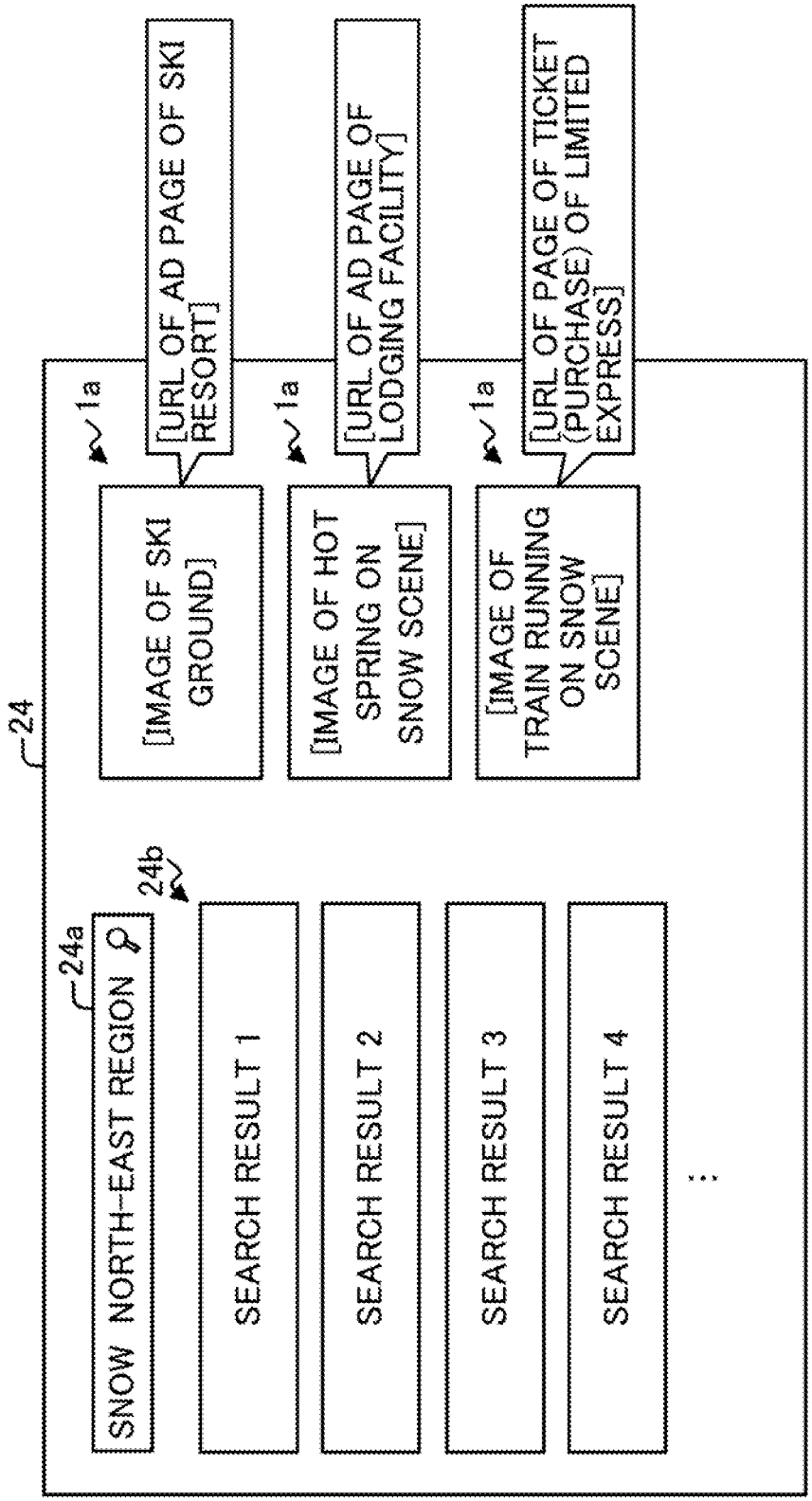
FIG. 16 is a diagram illustrating an example of displaying an advertisement on the display unit of a terminal.

For example, as illustrated in FIG. 16, it is assumed that "snow north-east region" is input in the input area 24a and the search result of "snow north-east region" is displayed in the display area 24b in the browser 24 of the terminal 2.

Figure 17:
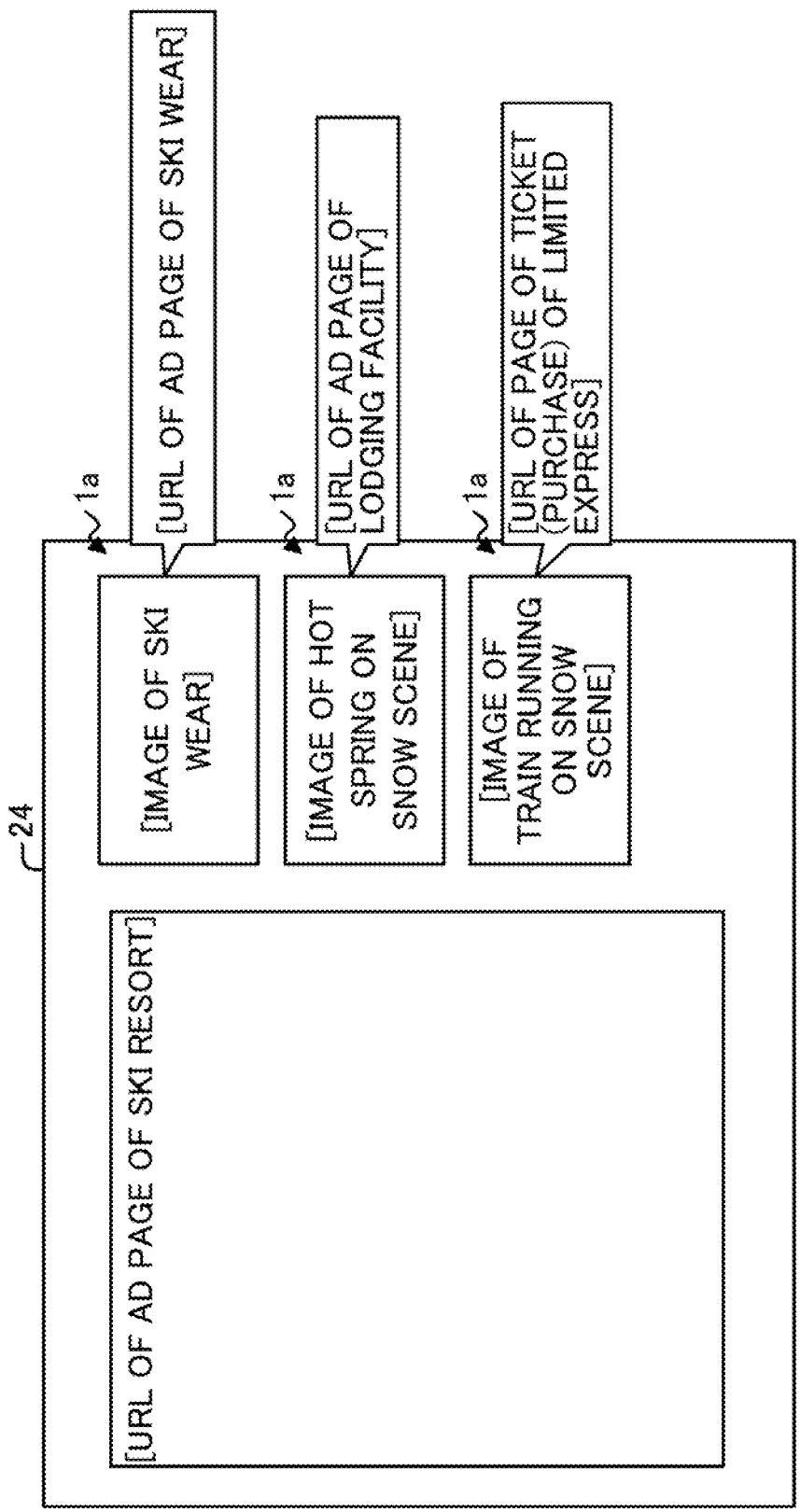
FIG. 17 is a diagram illustrating an example of a cushion page for displaying advertisements in multiple stages.

In this case, [image of ski resort], [image of hot spring on snow scene], and [image of train running on snow scene] are displayed as the ads 1a, and [image of ski resort] is selected and the screen is converted to [URL of advertisement page of a ski resort], the screen illustrated in FIG. 17 may be displayed.

FIG. 17 is an example of a cushion page for displaying advertisements in multiple layers. As illustrated in FIG. 17, the browsers 24 may display [advertisement page of a ski resort] and may display ad 1a related to [ski], for example. The ad 1a may be ad data 21e generated by the ad distributing server 5 on the basis of the operation history 31a representing the [URL of advertisement page of a ski resort] is selected.

The "advertisement page of a ski resort" may be a web page provided by an advertiser or an advertisement agency, and in this case, the browser 24 may separate or overlay the displaying of the web page and the display of the ad 1a. Alternatively, in the "ad page of ski resort", the ad distributing server 5 or the browser 24 may generate the layout of a cushion page in which the content of the web page and the ad 1a (advertisement frames) are merged by the browser 24 on the basis of the page and the ad. In any of these examples, the [URL of advertisement page of a ski resort] may be a URL for a cushion page (e.g., a web server included in the ad distributing server 5) that is different from the URL of a web page provided by an advertiser or an advertisement agency.

As described above, the contents related to the product may be a cushion page generated on the basis of a web page provided by an advertiser or an advertisement agency. Here, a cushion page can be said to be a web page that introduces a product and displays an ad 1a of a product related to the product.

[1-7] Example of Operation;

Next, referring to FIGS. 18 to 22, an example of operation of the ad distributing system 1 configured as described above will now be described.

Figure 18:
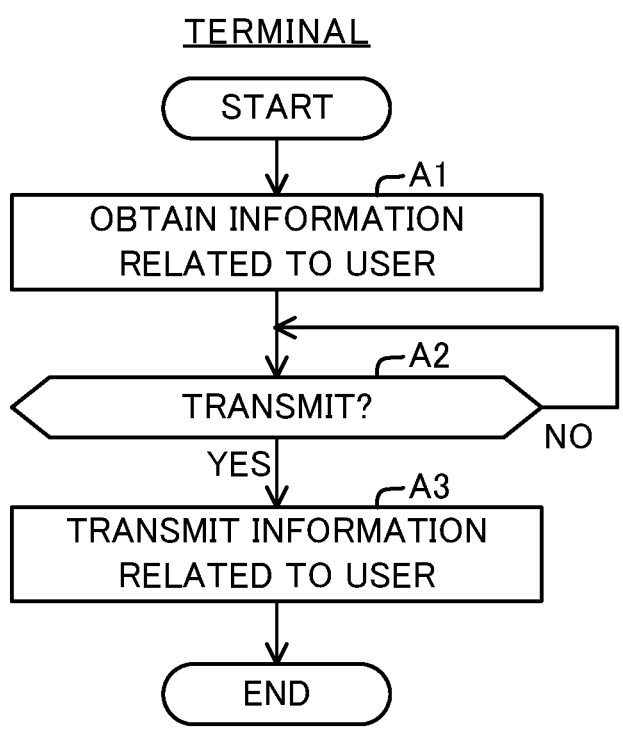
FIG. 18 is a flowchart illustrating an example of operation of a terminal according to one embodiment.

[1-7-1] Terminal:

As illustrated in FIG. 18, at least one of the input unit 22, the APP 24, the position information obtainer 25 and the activity history obtainer 26 of the terminal 2 obtains the information 5b related to the user in response to, for example, operation made by the user (Step A1), and stores the information 5b into the memory unit 21.

The communicating unit 27 determines whether or not it is the transmission timing at which the information 5b related to the user is transmitted (Step A2), and if it is not the transmission timing (NO in Step A2), waits until the transmission timing comes.

On the other hand, if it is the transmission timing (YES in Step A2), the communicating unit 27 transmits the information 5b related to the users to the information collecting server 3 or the server 8 (Step A3), and the process ends.

Figure 19:
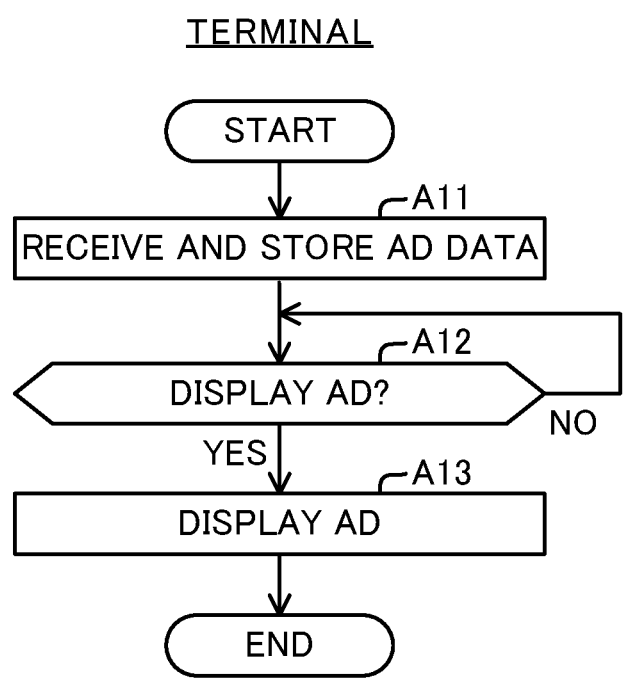
FIG. 19 is a flowchart illustrating an example of operation of a terminal according to one embodiment.

As illustrated in FIG. 19, the communicating unit 27 of the terminal 2 receives advertisement data from the ad distributing server 5 and stores the advertisement data into the memory unit 21 (Step A11).

The OS or the APP 24 determines whether or not it is a displaying timing at which the ad 1a is displayed, such as the timing of displaying a web page (Step A12), and if it is not the displaying timing (NO in Step A12), waits until the displaying timing comes.

On the other hand, if it is the display timing (YES in Step A12), the OS or the APP 24 displays the ad data 21e on the display 23 (Step A13), and the process ends.

Figure 20:
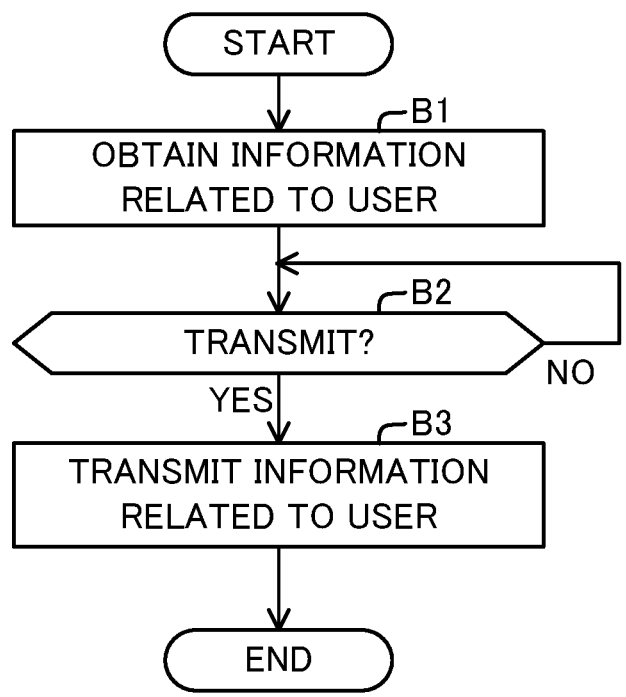
FIG. 20 is a flowchart illustrating an operation example of the information collecting server according to one embodiment.

[1-7-2] Information Collection Server:

As illustrated in FIG. 20, the collector 32 of the information collecting server 3 obtains the information 5b related to the user from at least one of the terminal 2, the cooperation server 4, and the server 8 (Step B1), and stores the information 5b to the DB 31.

The communicating unit 33 determines whether or not it is the transmission timing at which the information 5b related to the user is transmitted (Step B2), and if it is not the transmission timing (NO Step B2), waits until the transmission timing comes.

On the other hand, if it is the transmission timing, for example, a timing at which the operation history 21a has been received or a transmission timing after a predetermined period of time has elapsed (YES in Step B2), the communicating unit 33 transmits the information 5b related to the user to the ad distributing server 5 (Step B3), and the process ends.

Figure 21:
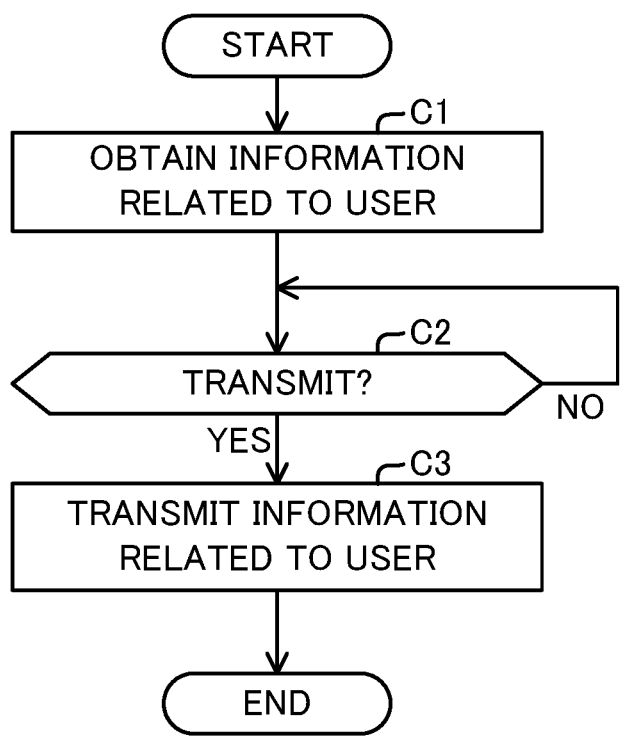
FIG. 21 is a flowchart illustrating an example of operation of a cooperation server according to one embodiment.

[1-7-3] Cooperation Server:

As illustrated in FIG. 21, the cooperator 42 of the cooperation server 4 obtains the information 5b related to the user from the PDS server 7 (Step C1) and stores the information 5b into the memory unit 41.

The communicating unit 43 determines whether or not it is the transmission timing at which the information 5b related to the user (relay data 41a) is transmitted (Step C2), and waits until the transmission timing comes, if it is not the transmission timing (NO in Step C2).

On the other hand, if it is the transmission timing (YES in Step C2), the communicating unit 43 transmits the information 5b related to the user to the information collecting server 3 (Step C3), and the process ends.

Figure 22:
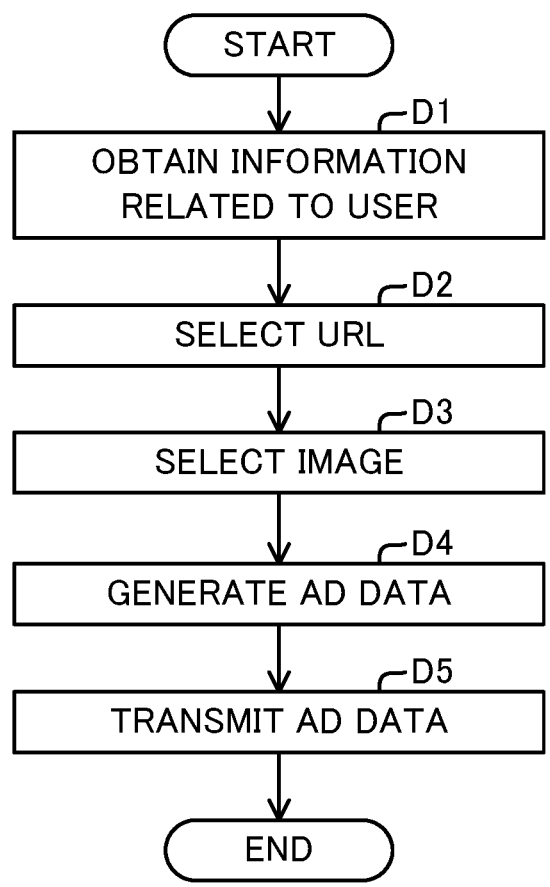
FIG. 22 is a flowchart illustrating an example of operation of an ad distributing server according to one embodiment.

[1-7-4] Advertisement Distributing Server:

As illustrated in FIG. 22, upon receipt of the information 5b related to the user from the information collecting server 3 (Step D1), the URL selector 52 of the ad distributing server 5 selects a URL based on the URL list 51a, and/or the relationship information 51c (Step D2).

The image selector 53 selects an image based on the result of the selecting at least one of the URL selector 52, the image list 51b, and the relationship information 51c (Step D3).

The ad generator 54 generates advertisement data based on the selected URL and image (Step D4).

The communicating unit 55 transmits the generated advertisement data to the terminal 2 (Step D5), and the process ends.

Figure 23:
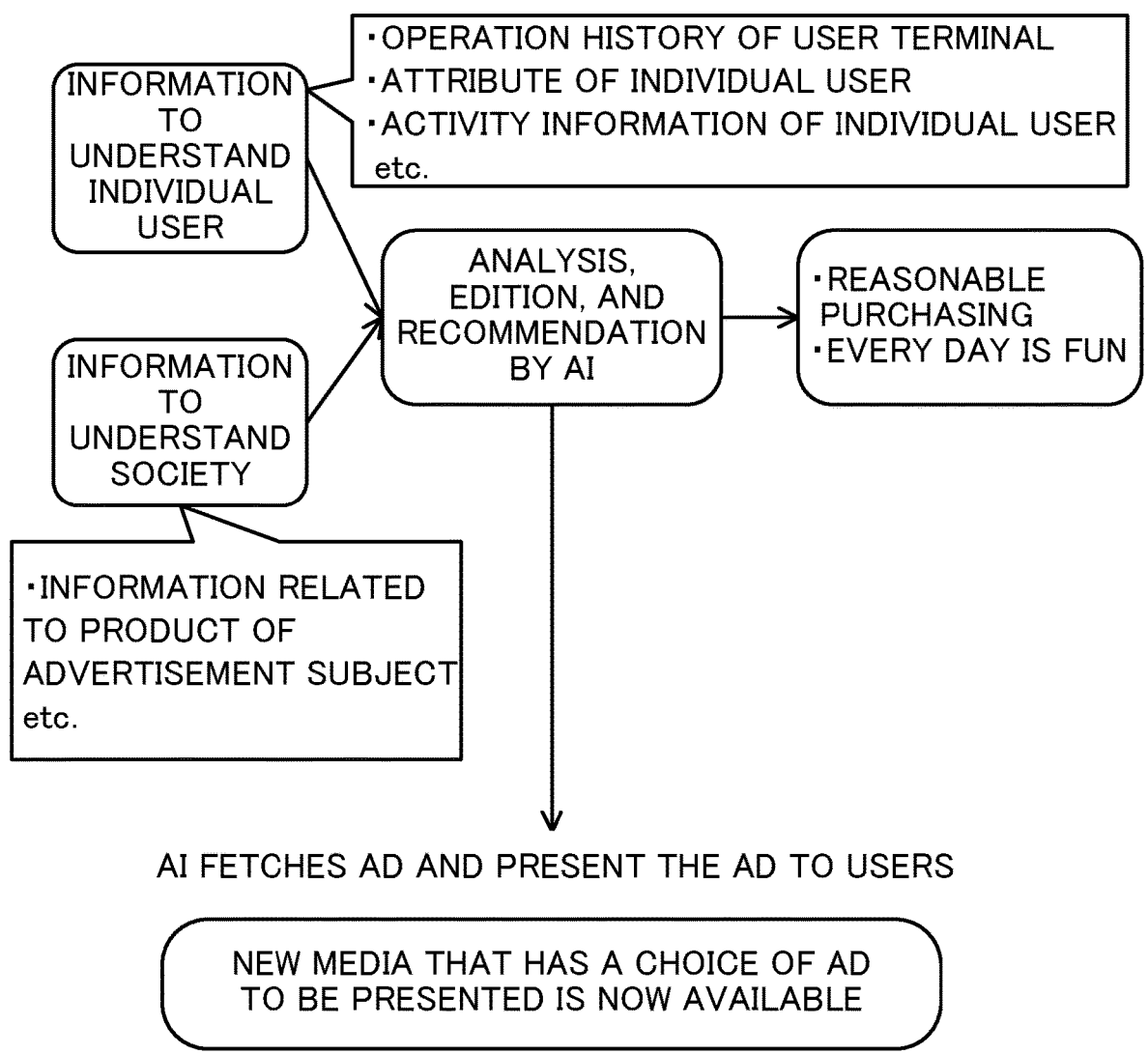
FIG. 23 is a diagram illustrating an example of advertisement proposal by a system for distributing an advertisement according to one embodiment.

[1-8] Effect:

As described above, according to the ad distributing system 1 of one embodiment, as illustrated in FIG. 23, for example, the ad 1a can be analyzed, edited, and proposed by the AI 5a on the basis of at least one of information that understands an individual user and information that understands the world.

The AI 5a is unable to simply propose the product itself (including services) to the user, but also can propose a pleasant and affluent lifestyle for the user.

For this purpose, the AI 5a can obtain ad 1a suitable for the user from the set of ad 1a and post the obtained ad 1a on the terminal 2. That is, the ad distributing system 1 may have a new medium, such as ad distributing server 5, having the option of advertising presentation.

Here, the information on the product may be classified into the following (i) to (iv) depending on whether or not the user is interested in the information, whether or not the selection is desired to be left to another person (e.g., advertising), and the like.

(i) A product that the user is highly interested and that has a tendency that the user wants select by himself/herself. Such a product is exemplified by a "vehicle" or the like can be cited.

(ii) A product that the user is less interested in but that has a tendency that the user wants select by himself/herself. Such a product includes, for example, "goods sold at Michino-Eki".

(iii) A product that the user is highly interested, but that has a tendency that the user wished to leave the selection to others because making the selection is troublesome. Such a product includes, for example, an "investment trust". An example of such "investment trust" includes "a financial product that is preferred to invest for the elderly".

(iv) A product that the user is less interested in and that has a tendency that the user wished to leave the selection to others because the user wants to know criteria for judgement. Examples of such a product include "hair care products".

For example, an exciting lifestyle or a good product for the user can create the user's interests. Therefore, according to the ad distributing system 1, it is possible to provide total support such as the user's well-being and peace of mind.

In the future, it is supposed that the concept that ownership of data regarding an individual user collected by various services, such as a purchase history, a coupon use history, and a ticket purchase history, belong to "individual" is widely spread to the society. Accordingly, a circumstance where the AI 5a and various services make use of data related to an individual user, i.e., the information 5b related to the user can be easily achieved, so that it is expected that shopping without selection made by the user is automated on behalf of the user.

[2] Miscellaneous

The techniques according to the above-described embodiment and modification can be modified and implemented as follows.

For example, the functional blocks illustrated in FIGS. 8 to 11 may be merged or divided in arbitrary combinations.

The information collecting server 3 may be implemented by any one of multiple servers 8. Illustratively, the information collecting server 3 may be one possessed or used by a communication carrier, the vendor of the terminal 2 or the OS.

In this instance, at least some of the attribute information 21b, the position information 21c and the activity history 21d of the terminal 2 may be transmitted from the terminal 2 to the information collecting server 3. This configuration makes it possible to reduce the amount of communications of the information collecting server 3 with the server 8 and with the PDS server 7 via the cooperation servers 4. Consequently, the resource-efficiency can be enhanced.

Further, the function of the cooperation servers 4 may be aggregated in the information collecting server 3. That is, the information collecting server 3 and the cooperation servers 4 may be integrated.

In addition, the functions of the information collecting server 3 and the cooperation servers 4 may be aggregated into the ad distributing server 5. That is, the information collecting server 3 and the cooperation servers 4, and the ad distributing server 5 may be integrated.

In one aspect, a technique for generating a more personalized web ad can be provided.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A system for generating an advertisement comprising:
a memory; and
a processor coupled to the memory, the processor configured to execute a process comprising:
obtaining an address of a content related to a product to be advertised, the product being determined by referring to at least one of an operation history of a user terminal operated by a user, an attribute of the user, and activity information of the user;
obtaining, based on information stored in the memory and related to a plurality of still images or moving images associated with each product, a still image or a moving image related to the product determined to be advertised;
generating advertisement data, by associating the still image or the moving image obtained, with the address representing a transfer destination when the still image or the obtained moving image is selected; and
displaying the advertisement data on the user terminal,
wherein:
the operation history includes information of a keyword inputted for a searching process on the user terminal;
the processor
obtains the still image or the moving image related to the product based on the keyword;
generates the advertisement data by associating the address with the still image or the moving image obtained based on the keyword; and
displays the advertisement data along with a result of searching on the keyword on the user terminal; and
the address of the content of the product stores the content of the product and advertisement data of one or more commodities of the product.

2. The system according to claim 1, wherein:
the attribute of the user includes information related to a hobby of the user; and
the processor obtains the still image or the moving image related to the product based on the information related to the hobby of the user.

3. The system according to claim 1, wherein:
the activity information of the user includes position information of the user terminal; and
the processor obtains the still image or the moving image related to the product based on the position information.

4. The system according to claim 1, wherein:
the activity information of the user includes an activity history of the user; and
the processor obtains the still image or the moving image related to the product based on the activity history.

5. A system for generating an advertisement comprising:
a memory;
a processor coupled to the memory, the processor configured to execute a process comprising:
obtaining an address of a content related to a product to be advertised to a first user operating a first user terminal, the first user belonging to a given group, the product being determined by referring to at least one of an operation history of a second user terminal operated by a second user belonging to the given group, an attribute of the second user, and activity information of the second user;

obtaining, based on information stored in the memory and related to a plurality of still images or moving images associated with each product, a still image or a moving image related to the product determined to be advertised;

generating advertisement data, by associating the still image or the moving image obtained, with the address representing a transfer destination when the still image or the obtained moving image is selected; and displaying the advertisement data on the first user terminal, wherein:

the operation history includes information of a keyword inputted for a searching process on the second user terminal;

the processor
   obtains the still image or the moving image related to the product based on the keyword;
   generates the advertisement data by associating the address with the still image or the moving image obtained based on the keyword; and
   displays the advertisement data along with a result of searching on the keyword on the second user terminal; and the address of the content of the product stores the content of the product and advertisement data of one or more commodities of the product.

6. The system according to claim 5, wherein the processor determines, to be the product to be advertised, a product common to two or more second users belonging to the given group by referring to at least one of the operation history of the second user terminals operated by each of the two or more second users, the attribute of each of the two or more second users, and activity information of each of the two or more second users.

7. A method for generating an advertisement by a computer, the method comprising:

obtaining an address of a content related to a product to be advertised, the product being determined by referring to at least one of an operation history of a user terminal operated by a user, an attribute of the user, and activity information of the user;

obtaining, based on information stored in a memory of the computer and related to a plurality of still images or moving images associated with each product, a still image or a moving image related to the product determined to be advertised; and generating advertisement data, by associating the still image or the moving image obtained, with the address representing a transfer destination when the still image or the obtained moving image is selected, wherein:

the operation history includes information of a keyword inputted for a searching process on the user terminal;

the method includes:
   obtaining the still image or the moving image related to the product based on the keyword;
   generating the advertisement data by associating the address with the still image or the moving image obtained based on the keyword; and
   displaying the advertisement data along with a result of searching on the keyword on the user terminal; and the address of the content of the product stores the content of the product and advertisement data of one or more commodities of the product.

8. The method according to claim 7, wherein:
the attribute of the user includes information related to a hobby of the user; and
the method further comprises obtaining the still image or the moving image related to the product based on the information related to the hobby of the user.

9. The method according to claim 7, wherein:
the activity information of the user includes position information of the user terminal; and
the method further comprises obtaining the still image or the moving image related to the product based on the position information.

10. The method according to claim 7, wherein:
the activity information of the user includes an activity history of the user; and
the method further comprises obtaining the still image or the moving image related to the product based on the activity history.

* * * * *